US010715036B2

(12) United States Patent
Giuliano

(10) Patent No.: US 10,715,036 B2
(45) Date of Patent: Jul. 14, 2020

(54) DC-DC TRANSFORMER WITH INDUCTOR FOR THE FACILITATION OF ADIABATIC INTER-CAPACITOR CHARGE TRANSPORT

(71) Applicant: pSemi Corporation, San Diego, CA (US)

(72) Inventor: David Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/260,343

(22) Filed: Jan. 29, 2019

(65) Prior Publication Data
US 2019/0157972 A1 May 23, 2019

Related U.S. Application Data

(63) Continuation of application No. 15/557,970, filed as application No. PCT/US2016/021920 on Mar. 11, 2016, now Pat. No. 10,193,441.

(Continued)

(51) Int. Cl.
*H02M 3/07* (2006.01)
(52) U.S. Cl.
CPC ..................... *H02M 3/07* (2013.01)
(58) Field of Classification Search
CPC .. H02M 3/07; H02M 3/073; H02M 2003/071; H02M 2003/072;
(Continued)

(56) References Cited

U.S. PATENT DOCUMENTS 4,214,174 A 7/1980 Dickson
4,408,268 A 10/1983 Peters
(Continued)

FOREIGN PATENT DOCUMENTS

CN 101636702 1/2010
CN 102904436 1/2013
(Continued)

OTHER PUBLICATIONS

Abutbul et al. "Step-Up Switching-Mode Converter With High Voltage Gain Using a Switched-Capacitor Circuit" *IEEE Transactions on Circuits and Systems I.*, vol. 50, pp. 1098-1102, Aug. 2003.
(Continued)

*Primary Examiner* — Yemane Mehari
(74) *Attorney, Agent, or Firm* — Berkeley Law & Technology Group, LLP

(57) ABSTRACT

In a power converter, a switching network having switches that operate at a common frequency and duty cycle interconnects circuit elements. These circuit elements include capacitors that are in a capacitor network and a magnetic filter. When connected to the capacitors by a switch from the switching network, the magnetic filter imposes a constraint upon inter-capacitor charge transfer between the capacitors to maintain the filter's second terminal at a voltage. The switching network transitions between states. These states include a first state, a second state, and a third state. In both the first state and the third state, the first magnetic-filter terminal couples to the capacitor network. In the second state, which occurs between the first and third state, the switches ground the first magnetic-filter terminal.

15 Claims, 30 Drawing Sheets

Related U.S. Application Data

(60) Provisional application No. 62/132,934, filed on Mar. 13, 2015.

(58) Field of Classification Search
CPC ....... H02M 3/155–158; H02M 3/1584; H02M 3/1588; Y02B 70/1466
USPC .... 323/266, 271, 288, 301, 388; 363/60, 71, 363/131, 132
See application file for complete search history.

(56) References Cited

U.S. PATENT DOCUMENTS

| | | | |
|---|---|---|---|
| 4,812,961 A | 3/1989 | Essaff et al. |
| 5,006,782 A | 4/1991 | Pelly |
| 5,132,606 A | 7/1992 | Herbert |
| 5,301,097 A | 4/1994 | McDaniel |
| 5,345,376 A | 9/1994 | Nourbakhsh |
| 5,557,193 A | 9/1996 | Kajimoto |
| 5,610,807 A | 3/1997 | Kanda et al. |
| 5,717,581 A | 2/1998 | Canclini |
| 5,737,201 A | 4/1998 | Meynard et al. |
| 5,761,058 A | 6/1998 | Kanda et al. |
| 5,801,987 A | 9/1998 | Dinh |
| 5,812,017 A | 9/1998 | Golla et al. |
| 5,907,484 A | 5/1999 | Kowshik et al. |
| 5,978,283 A | 11/1999 | Hsu et al. |
| 6,107,864 A | 8/2000 | Fukushima et al. |
| 6,400,579 B2 | 6/2002 | Cuk |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader et al. |
| 6,650,552 B2 | 11/2003 | Takagi et al. |
| 6,759,766 B2 | 7/2004 | Hiratsuka et al. |
| 6,791,298 B2 | 9/2004 | Shenai |
| 6,798,177 B1 | 9/2004 | Liu |
| 6,927,441 B2 | 8/2005 | Pappalardo et al. |
| 6,980,181 B2 | 12/2005 | Sudo |
| 7,071,660 B2 | 7/2006 | Ming |
| 7,135,847 B2 | 11/2006 | Taurand |
| 7,145,382 B2 | 12/2006 | Ker et al. |
| 7,190,210 B2 | 3/2007 | Azrai et al. |
| 7,224,062 B2 | 5/2007 | Hsu |
| 7,239,194 B2 | 7/2007 | Azrai et al. |
| 7,250,810 B1 | 7/2007 | Tsen |
| 7,408,330 B2 | 8/2008 | Zhao |
| 7,511,978 B2 | 3/2009 | Chen et al. |
| 7,595,682 B2 | 9/2009 | Lin et al. |
| 7,616,467 B2 | 11/2009 | Mallwitz |
| 7,724,551 B2 | 5/2010 | Yanagida et al. |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,907,430 B2 | 3/2011 | Kularatna et al. |
| 7,928,705 B2 | 4/2011 | Hooijschuur et al. |
| 7,977,921 B2 | 7/2011 | Bahai et al. |
| 7,999,601 B2 | 8/2011 | Schlueter et al. |
| 8,018,216 B2 | 9/2011 | Kakehi |
| 8,040,174 B2 | 10/2011 | Likhterov |
| 8,048,766 B2 | 11/2011 | Joly et al. |
| 8,076,915 B2 | 12/2011 | Nakazawa |
| 8,089,788 B2 | 1/2012 | Jain |
| 8,102,157 B2 * | 1/2012 | Abe ........................ H02M 3/07 320/166 |
| 8,106,597 B2 | 1/2012 | Mednik et al. |
| 8,111,052 B2 | 2/2012 | Glovinsky |
| 8,111,054 B2 | 2/2012 | Yen et al. |
| 8,159,091 B2 | 4/2012 | Yeates |
| 8,193,604 B2 | 6/2012 | Lin et al. |
| 8,212,541 B2 | 7/2012 | Perreault et al. |
| 8,330,436 B2 | 12/2012 | Oraw et al. |
| 8,339,184 B2 | 12/2012 | Kok et al. |
| 8,350,549 B2 | 1/2013 | Kitabatake |
| 8,384,467 B1 | 2/2013 | O'Keeffe et al. |
| 8,395,914 B2 | 3/2013 | Klootwijk et al. |
| 8,423,800 B2 | 4/2013 | Huang et al. |
| 8,456,874 B2 | 6/2013 | Singer et al. |
| 8,503,203 B1 | 8/2013 | Szczeszynski et al. |
| 8,582,333 B2 | 11/2013 | Oraw et al. |
| 8,619,445 B1 | 12/2013 | Low et al. |
| 8,693,224 B1 | 4/2014 | Giuliano |
| 8,723,491 B2 | 5/2014 | Giuliano |
| 8,743,553 B2 | 6/2014 | Giuliano |
| 8,817,501 B1 | 8/2014 | Low et al. |
| 8,854,019 B1 | 10/2014 | Levesque |
| 8,856,562 B2 | 10/2014 | Huang et al. |
| 8,860,396 B2 * | 10/2014 | Giuliano ................. H02M 3/07 323/288 |
| 9,041,459 B2 | 5/2015 | Szczeszynski et al. |
| 9,203,299 B2 | 12/2015 | Low et al. |
| 9,742,266 B2 | 8/2017 | Giuliano et al. |
| 9,882,471 B2 | 1/2018 | Giuliano |
| 9,887,622 B2 | 2/2018 | Low et al. |
| 2002/0158660 A1 | 10/2002 | Jang et al. |
| 2003/0169096 A1 | 9/2003 | Hsu et al. |
| 2003/0227280 A1 | 12/2003 | Vinciarelli |
| 2004/0041620 A1 | 3/2004 | D'Angelo et al. |
| 2005/0007184 A1 | 1/2005 | Kamijo |
| 2005/0024125 A1 | 2/2005 | McNitt et al. |
| 2005/0207133 A1 | 9/2005 | Pavier et al. |
| 2006/0139021 A1 | 6/2006 | Taurand |
| 2007/0210774 A1 | 9/2007 | Kimura et al. |
| 2007/0230221 A1 | 10/2007 | Lim et al. |
| 2007/0296383 A1 | 12/2007 | Xu et al. |
| 2008/0150621 A1 | 6/2008 | Lesso et al. |
| 2008/0157732 A1 | 7/2008 | Williams |
| 2008/0157733 A1 | 7/2008 | Williams |
| 2008/0239772 A1 | 10/2008 | Oraw et al. |
| 2009/0033293 A1 | 2/2009 | Xing et al. |
| 2009/0102439 A1 | 4/2009 | Williams |
| 2009/0225012 A1 | 9/2009 | Choi |
| 2009/0257211 A1 | 10/2009 | Kontani et al. |
| 2009/0278520 A1 * | 11/2009 | Perreault ................. H02M 3/07 323/282 |
| 2010/0110741 A1 | 5/2010 | Lin et al. |
| 2010/0140736 A1 | 6/2010 | Lin et al. |
| 2010/0202161 A1 | 8/2010 | Sims et al. |
| 2010/0214746 A1 | 8/2010 | Lotfi et al. |
| 2010/0244189 A1 | 9/2010 | Klootwijk et al. |
| 2010/0244585 A1 | 9/2010 | Tan et al. |
| 2011/0163414 A1 | 7/2011 | Lin et al. |
| 2012/0146177 A1 | 6/2012 | Choi et al. |
| 2012/0249096 A1 | 10/2012 | Enenkel |
| 2012/0313602 A1 | 12/2012 | Perreault et al. |
| 2012/0326684 A1 | 12/2012 | Perreault et al. |
| 2013/0049714 A1 | 2/2013 | Chiu |
| 2013/0058141 A1 | 3/2013 | Oraw et al. |
| 2013/0094157 A1 | 4/2013 | Giuliano |
| 2013/0154600 A1 * | 6/2013 | Giuliano ................. H02M 3/07 323/304 |
| 2013/0163302 A1 | 6/2013 | Li et al. |
| 2013/0181521 A1 | 7/2013 | Khlat |
| 2013/0229841 A1 | 9/2013 | Giuliano et al. |
| 2014/0159681 A1 | 6/2014 | Oraw et al. |
| 2014/0177300 A1 | 6/2014 | Lagorce et al. |
| 2017/0085172 A1 * | 3/2017 | Low ....................... H02M 3/07 |
| 2017/0244318 A1 * | 8/2017 | Giuliano ................. H02M 3/07 |
| 2018/0062507 A1 * | 3/2018 | Giuliano ................. H02M 3/07 |

FOREIGN PATENT DOCUMENTS

| | | |
|---|---|---|
| EP | 1199788 | 4/2002 |
| FR | 2852748 | 9/2004 |
| JP | 10327573 | 12/1998 |
| JP | 11235053 | 8/1999 |
| JP | 2002-233139 | 8/2002 |
| JP | 2009-022093 | 1/2009 |
| JP | 2010045943 | 2/2010 |
| KR | 10-2010-0023304 | 3/2010 |
| WO | 2006093600 | 9/2006 |
| WO | 2009112900 | 9/2009 |

(56) References Cited

FOREIGN PATENT DOCUMENTS

| WO | 2013059446 | 4/2013 |
|----|------------|--------|
| WO | 2013096416 | 6/2013 |
| WO | 2014/154390 | 10/2014 |
| WO | 2014/169186 | 10/2014 |
| WO | 2017091696 | 6/2017 |
| WO | 2017143044 | 8/2017 |
| WO | 2017156532 | 9/2017 |
| WO | 2017160821 | 9/2017 |
| WO | 2017161368 | 9/2017 |
| WO | 2017196826 | 11/2017 |

OTHER PUBLICATIONS

Axelrod et al. "Single-switch single-stage switched-capacitor buck converter", *Proc. of NORPIE 2004, 4th Nordic Workshop on Power and Industrial Electronics*, Jun. 2004.

Han et al. "A New Approach to Reducing Output Ripple in Switched-Capacitor-Based Step-Down DC-DC Converters" *IEEE Transactions on Power Electronics*, vol. 21, No. 6, pp. 1548-1555 Nov. 2006.

Lei et al. "Analysis of Switched-capacitor DC-DC Converters in Soft-charging Operation" *14th IEEE Workshop on Control and Modeling for Power Electronics*, pp. 1-7, Jun. 23, 2013.

Linear Technology data sheet for part LTC3402, "2A, 3MHz Micropower Synchronous Boost Converter", 2000.

Ma et al, "Design and Optimization of Dynamic Power System for Self-Powered Integrated Wireless Sensing Nodes" ACM ISPLED '05 conference (published at pp. 303-306 of the proceedings).

Markowski, "Performance Limits of Switched-Capacitor DC-DC Converters", IEEE PESC'95 Conference, 1995.

Ng et al. "Switched Capacitor DC-DC Converter: Superior where the Buck Converter has Dominated" *PhD Thesis, UC Berkeley*, Aug. 17, 2011.

Ottman et al, "Optimized Piezoelectric Energy Harvesting Circuit using Step-Down Converter in Discontinuous Conduction Mode", IEEE Power Electronics Specialists Conference, pp. 1988- 1994, 2002.

Pilawa-Podgurski et al. "Merged Two-Stage Power Converter with Soft Charging Switched-Capacitor Stage in 180 nm CMOS," *IEEE Journal of Solid-State Circuits*, vol. 47, No. 7, pp. 1557-1567, Jul. 2012.

Pilawa-Podgurski et al. "Merged Two-Stage Power Converter Architecture with Soft Charging Switched-Capacitor Energy Transfer" *39th IEEE Power Electronics Specialists Conference*, 2008.

R. D. Middlebrook, "Transformerless DC-to-DC Converters with Large Conversion Ratios" *IEEE Transactions on Power Elecfronics*, vol. 3, No. 4, pp. 484-488, Oct. 1988.

Starzyk et al., "A DC-DC Charge Pump Design Based on Voltage Doublers," IEEE Transactions on Circuits and Systems—I: Fundamental Theory and Applications, vol. 48, No. 3, Mar. 2001, pp. 350-359.

Sun et al. "High Power Density, High Efficiency System Two-Stage Power Architecture for Laptop Computers", *Power Electronics Specialists Conference*, pp. 1-7, Jun. 2006.

T. A. Meynard, H. Foch, "Multi-Level Conversion: High Voltage Choppers and Voltage-Source Inverters," *IEEE Power Electronics Specialists Conference*, pp. 397-403, 1992.

Texas Instruments data sheet for part TPS54310, "3-V to 6-V input, 3-A output synchronous-buck PWM switcher with integrated FETs", dated 2002-2005.

Umeno et al. "A New Approach to Low Ripple-Noise Switching Converters on the Basis of Switched-Capacitor Converters" *IEEE International Symposium on Circuits and Systems*, vol. 2, pp. 1077-1080, Jun. 1991.

Wood et al, "Design, Fabrication and Initial Results of a 2g Autonomous Glider" *IEEE Industrial Electronics Society*, pp. 1870-1877, Nov. 2005.

Xu et al., "Voltage Divider and its Application in Two-stage Power Architecture," IEEE Twenty-First Annual IEEE Applied Power Electronics Conference and Exposition, pp. 499-504, Mar. 2006.

\* cited by examiner under typical operation, the low voltage pair of terminals would be the charge transfer rate constraint terminals of the voltage transformer.

DC-DC TRANSFORMER WITH INDUCTOR FOR THE FACILITATION OF ADIABATIC INTER-CAPACITOR CHARGE TRANSPORT

CROSS REFERENCE TO RELATED APPLICATION

This application is a continuation of U.S. application Ser. No. 15/557,970, filed on Sep. 13, 2017, which is the national phase under 35 USC 371 of international application no. PCT/US2016/021920 filed Mar. 11, 2016 which claims the benefit of the priority date of U.S. Provisional Application No. 62/132,934, filed Mar. 13, 2015. The contents of which are incorporated herein in their entirety.

FIELD OF DISCLOSURE

This disclosure relates to power conversion, and in particular, to DC power conversion.

BACKGROUND

A known power converter is obtained by placing a regulator in series with a charge pump. An example of such a regulator operates by switching an inductor into one state and into a second state according to some switch duty cycle. The inductor in this regulator performs two functions. One is to control the output voltage of the converter. The other is to promote adiabatic charge transfer among the capacitors within the charge pump.

Known power converters operating according to the above principles are described in U.S. Pat. Nos. 8,860,396, 8,743,553, 8,503,203, 8,693,224, 8,339,184, 8,619,445, 8,723,491, and 8,817,501, the contents of which are all herein incorporated by reference in their entirety.

SUMMARY

The invention is based on the recognition that the regulator's dual function of regulation and promoting adiabatic charge transfer can be carried out by different components.

The invention includes reducing the functionality of a component that has always been used to carry out two functions and relocating it so that it can no longer carry out one of those functions. A new circuit component is added to carry out the function that used to be carried out by the existing component. The invention thus achieves a more complex circuit with an additional component that was not needed in the prior art.

The invention also reduces the die area required for the circuit by increasing the number of components that have to be placed on the die.

In addition to reducing chip area, the invention described herein also fills in certain holes in the performance of the overall power converter and makes it possible to carry out more of the voltage transformation within the charge pump, where it can be done most efficiently.

In a general aspect, one or more arrangements of a power converter are made up of a combination of an interconnection of sections, including at least a "voltage transformer," a "magnetic filter," and a "current regulator," wherein these denotations have no further implicit connotations.

The power converter has terminals that include a first pair of terminals and a second pair of terminals, also referred to as the "controller" pair of terminals. In at least some embodiments, an operating power converter controls a voltage measured between the controlled pair of terminals. Typically, the power converter accepts power at the first pair of terminals from a power source (e.g., an unregulated voltage source), referred to as the "powered" pair of terminals, and provides power at a controlled voltage at the second pair of terminals (e.g., to a substantially resistive load), referred to as the "load" pair of terminals. It should be understood, however, that other arrangements can be used.

The voltage transformer, which is not to be confused with a conventional magnetic core alternating current "transformer," has a least three terminals and comprises a switched arrangement of capacitors. Generally, sequential operation of switches in the voltage transformer causes a voltage transformation, generally by a rational multiple, between a first pair of terminals of the voltage transformer and a second pair of terminals of the voltage transformer. In general, one pair of terminals is associated with a higher voltage than the other pair. These pairs of terminals are hereinafter referred to as the "high voltage" pair of terminals and the "low voltage" pair of terminals, respectively.

The sequential operation of the switches causes charge to transfer between capacitors of the voltage transformer. The rate of charge transfer is constrained by a current through at least one of the terminals of the voltage transformer. This terminal will be referred to as a "charge transfer rate constraint" terminal.

When the rate of charge transfer between capacitors in at least one capacitor of the voltage transformer is constrained for at least some of the time, for example, by the current at the charge transfer rate constraint terminals, the voltage transformer is deemed to be "adiabatic." If at least some but not necessarily all of the charge transfers are controlled, the voltage transformer is termed "partially adiabatic." Otherwise the voltage transformer is "fully adiabatic."

The magnetic filter comprises two terminals coupled in a circuit path without any switching activity. The magnetic filter opposes changes in the current flowing through at least one of the terminals, hereinafter referred to as the "filtered terminal(s)" of the magnetic filter, and generally maintains a substantially constant current through the filtered terminal(s) during steady state operation of the power converter. In some examples, the circuit path joining the terminals includes a passive inductor. In any case, because the path between the two terminals does not require a switch, there is no switch on the path that must be sized or selected to accommodate the maximum voltage or current that may be present on the path during operation.

The current regulator has at least two terminals and comprises a switched arrangement of at least one inductor. Generally, controlled sequential operation of one or more switches of the current regulator controls current flow through a least one of the terminals, hereinafter referred to as a "controlled terminal," of the current regulator. In general, although the current regulator may regulate current flow, the regulation of current flow may be based on the output voltage (e.g., a time average voltage), which may be measured between a pair of terminals of the current regulator, or between other terminals within or at the interface of the power converter.

A common feature of a number of embodiments is that the arrangement of the voltage transformer, magnetic filter, and current regulator of the power converter is that a filtered terminal of the magnetic filter is directly coupled (i.e., without intervening switches) to a first terminal of the voltage transformer, with this first terminal being a charge transfer control terminal. Preferably, the magnetic filter is so coupled to a low voltage pair of terminals, recognizing that generally, the magnitude of current flow is higher at the low voltage terminals that at the high voltage terminals of the voltage transformer.

Another common feature is that the controlled terminal of the current regulator is directly coupled (i.e., without intervening switches) to a second terminal (different than the first terminal) of the voltage transformer. The second terminal may be, but is not necessarily, a charge transfer rate control terminal of the voltage transformer.

In some examples, the current regulator is coupled to multiple terminals of the voltage transformer, or to multiple separate voltage transformer sections of the power converter. In other examples, multiple current regulators, or current regulators having multiple separate controlled terminals, are coupled to multiple terminals of the voltage transformer or to multiple separate voltage transformers.

In operation of the power converter, the current regulator is controlled to achieve a controlled voltage at the controlled terminals of the power converter.

A number of configurations of the voltage transformer, magnetic filter, and current regulator can be grouped into (possibly overlapping) classes referred to as "series," "sigma," and "pseudo series," without connoting any particular attributes by these names.

The series class of configurations includes configurations in which the current regulator, the voltage transformer, and the magnetic filter are connected in series between the first pair and the second pair of terminals of the power converter. In at least some of these configurations, the magnetic filter is coupled to a controlled/load terminals of the power converter, and the current regulator is coupled to a powered terminal of the regulator. In at least other of these configurations, the magnetic filter is coupled to a powered terminal of the power converter and the current regulator is coupled to a controlled terminal of the power converter.

The sigma class and the pseudo series class of configurations include configurations in which one controlled terminal of the current regulator is coupled to a controlled terminal of the power converter. The voltage transformer is also coupled to the same (or potentially a different) controlled terminal of the power converter via the magnetic filter such that the magnetic filter provides a path from a charge transfer rate control terminal of the voltage transformer to the controlled terminal. In at least some configurations of the sigma class, another terminal of the current regulator is coupled to the voltage transformer, such that in operation, control of the current regulator affects a voltage on the first pair or the second pair of terminals of the voltage transformer. For example, if a terminal of the first pair of terminals of the voltage transformer is coupled via the magnetic filter to a controlled terminal of the power converter to which a controlled terminal of the current regulator is also coupled, then another terminal of the current regulator is coupled to a terminal of the second pair of terminals of the voltage transformer.

The sigma class of configurations includes configurations in which there exists a path from a terminal of the first pair of terminals of the power converter to a terminal of the second pair of terminals of the power converter that passes through the current regulator without passing through the voltage transformer.

The pseudo series class of configurations includes configurations in which the voltage transformer is coupled to a controlled terminal of the power converter through a first path that passes via the magnetic filter but not the current regulator, as well as via a second path that that passes via the current regulator but not the magnetic filter.

An advantage of at least some configurations of the sigma and the pseudo parallel classes is that some of the power flow through the power converter passes through the magnetic filter but not the current regulator. Because the magnetic filter does not introduce a switch on power flow path though the magnetic filter, power losses (e.g., resistive and capacitive losses in a switch) are reduced and overall efficiency of the power converter is improved.

An advantage of at least some configurations of any of the classes are that the number or range of combinations of terminal voltages supported by the power converted can be increases as compared to other configurations that are affected by limitations on voltage differences between pair of its terminals of the current regulator that differ by less than a threshold voltage.

Another advantage of at least some configurations is that voltage or current handling requirements of switches of the voltage transformed and/or the current regulator can be reduced as compared to other configurations. These reduced requirements can result in physically smaller semiconductor devices, which can reduce the size of an integrated circuit implementation of some or all of the power converter.

In one aspect, the invention features a power converter that transforms a first voltage at a first power-converter terminal into a second voltage at a second power-converter terminal. The power converter includes a switching network in which switches that operate at a common frequency and duty cycle interconnect certain circuit elements. These circuit elements include a magnetic filter and capacitors. The magnetic filter includes first and second magnetic-filter terminals, with the second magnetic-filter terminal being maintained at the second voltage. When connected to the capacitors by a switch from the switching network, the magnetic filter imposes a constraint upon inter-capacitor charge transfer between the capacitors.

During the course of its operation, the switching network transitions between states. These states include at least first, second, and third states. In both the first state and the third state, the first magnetic-filter terminal couples to the capacitor network. In the second state, which occurs between the first and third states, the switches ground the first magnetic-filter terminal is grounded Embodiments include those in which the capacitors and the switching network cooperate to define a single-phase charge pump and those in which they cooperate to define a multi-phase charge pump.

In some embodiments, in the first state, the first magnetic-filter terminal couples to a node, a cathode of a first capacitor connects to the node, and an anode of a second capacitor connects to the node. In the second state, cathodes of the first and second capacitors connect to each other and the first magnetic-filter terminal connects to an anode of one of the first and second capacitors.

In some embodiments, there exists a fourth state, with the fourth state being either the first state, the second state, or the third state. In these embodiments, the switching network executes a cycle that begins with a transition out of the fourth state and ends with a transition into the fourth state. Among these are embodiments in which the cycle consists of four transitions between states and those in which the cycle consists of only three transitions between states.

Also among the embodiments are those in which the second state occurs twice.

In some embodiments, the switching network comprises a stabilizing switch that connects a stabilizing capacitor to the first magnetic-filter terminal and disconnects the stabilizing capacitor from the first magnetic-filter terminal.

Among these are embodiments in which, during a cycle, each switch in the switching network sustains a current therethrough and the stabilizing switch sustains less current than any other switch in the switching network.

In some embodiments, the second magnetic-filter terminal connects to capacitor.

In other embodiments, the switching network comprises a first switch. This first switch connects the first magnetic-filter terminal to the capacitor network and disconnects the first magnetic-filter terminal from the capacitor network. Among these are embodiments that also include a second switch. This second switch connects the first magnetic-filter terminal to ground when the first switch has disconnected the first magnetic-filter terminal from the capacitor network. The second switch is open otherwise.

In some embodiments, the switching network comprises a first switch. The first switch transitions between first and second states. The first state connects the first magnetic-filter terminal to ground. The second state disconnects the first magnetic-filter terminal from ground.

In some embodiments, the magnetic filter is a constituent of an LC circuit connected to the capacitor network. Among these are embodiments in which the capacitor network and the switching network cooperate to define a two-phase charge pump.

Some embodiments include a controller for controlling operation of the regulator based on an output of the power converter. Others include a clock configured to provide a clock signal to either the regulator or the charge pump.

Also among the embodiments are those that have a control system configured to control operation of the power converter based on a measured output of the power converter. Among these are those that have a controller to control the regulator, those that have a controller to control the charge pump, those that have both, those that have a clock signal input that can receive a clock signal, those in which the controller has digital inputs, those in which the controller has analog inputs, and any combination of the foregoing.

In another aspect, the invention features an apparatus that includes switches that interconnect capacitors of a charge pump that connects to a first terminal of a power converter that comprises the charge pump and a regulator. A first power path connects the power converter to a first terminal of a magnetic filter and a second power path connects the power converter to a second terminal of the magnetic filter and to a second terminal of the power converter.

In some embodiments are those in which the first power path couples the charge pump to the magnetic filter and the magnetic filter imposes a constraint in inter-capacitor charge transport within the charge pump and wherein a third power path connects the charge pump to the regulator.

In other embodiments, the first power path couples the regulator to the magnetic filter and a third power path connects the charge pump to the regulator.

Embodiments include those in which the charge pump and the regulator share a common ground and those in which the charge pump has a fixed reference potential and the regulator has a floating reference potential or vice versa.

A variety of charge pumps and regulators can be used. For example, among the embodiments are those that have a multi-phase charge pump, those that have a single-phase charge pump, those that have a multi-stage charge pump, those have a two-phase charge pump, those that have a resonant power converter, those that have a switch mode power converter, those that have a buck converter, those that have a bidirectional regulator, and those that a multi-phase regulator.

In some embodiments, the charge pump comprises capacitors interconnected by sets of switches. During operation, switches in the first set are opposite in state to switches in the second set.

In some embodiments, the charge pump is a reconfigurable charge pump. Among these are embodiments in which the regulator is configured to transition from providing a first voltage to providing a second voltage during reconfiguration of the charge pump.

In another aspect, the invention features an apparatus for power transformation. Such an apparatus includes a power converter having a charge pump, a first regulator that regulates the power provided by the power converter, and a magnetic filter connected to a terminal of the charge pump. The particular terminal to which the magnetic filter is connected is selected to facilitate causing a constraint in inter-capacitor charge transport within the charge pump.

In another aspect, the invention features a power converter that has switches that cause it to carry out cycles of operation. Each cycle of operation comprises connecting a first capacitor network to a first terminal of a magnetic filter, disconnecting the first capacitor network from said first terminal, connecting a second capacitor network to the first terminal, and disconnecting the second capacitor network from said first terminal to end said cycle, wherein disconnecting the first terminal comprises grounding the first terminal.

Among these are embodiments in which connecting the first capacitor network comprises connecting a cathode of a first capacitor to an anode of a second capacitor, connecting the cathode to the first terminal, and connecting the anode to the first terminal.

In another aspect, the invention features a non-transitory computer-readable medium that stores a data structure that is to be operated upon by a program executable on a computer system, wherein, when operated upon by such a program, the data structure causes at least a portion of a process for fabricating an integrated circuit that includes circuitry described by the data structure, wherein the circuitry described by the data structure includes a switching network that has been configured to be used with a power converter that comprises the components described above.

These and other features of the invention will be apparent from the following detailed description, and the accompanying figures, in which:

DETAILED DESCRIPTION

Figure 1:
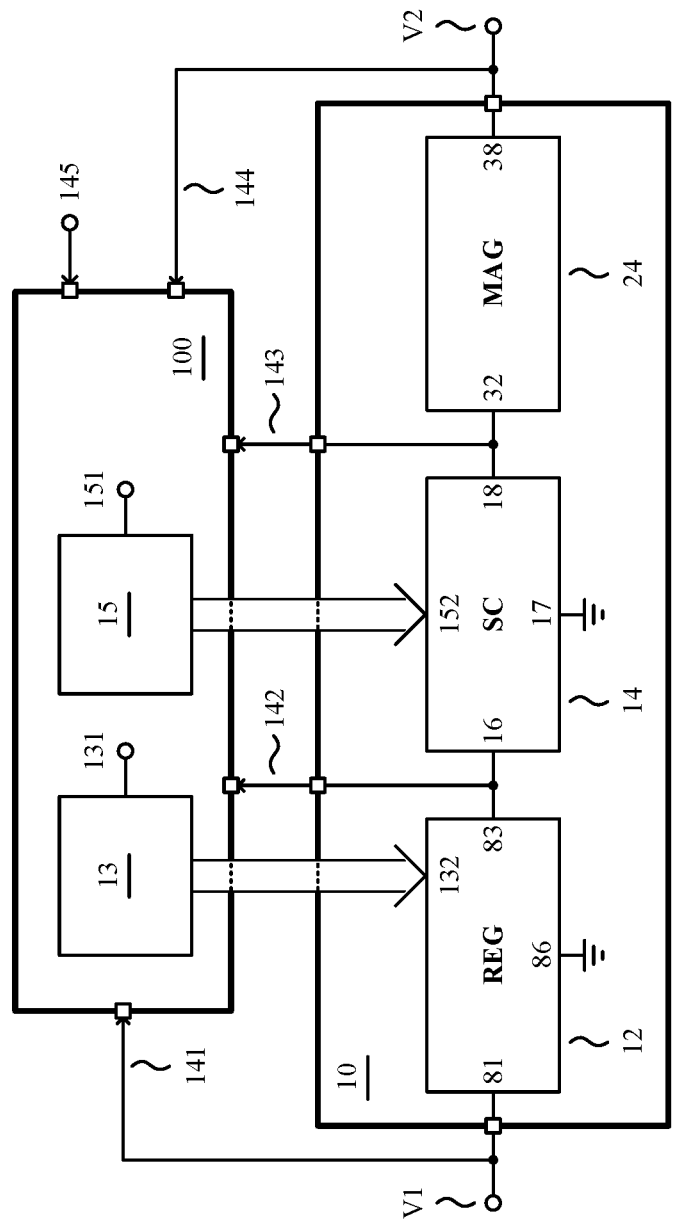
FIG. 1 shows one embodiment of a power converter.

A charge pump has a high-voltage terminal and a low-voltage terminal. Because of conservation of energy, the high-voltage terminal is associated with a lower current, whereas the low-voltage terminal is associated with a higher current. The regulator can, in principle, be placed at either end.

However, in order to allow the inductor in the regulator to participate in the adiabatic charging of all capacitors in the charge pump, it is important that the regulator be connected to the low-voltage side. There are two disadvantages to this configuration: one physical and the other operational.

The physical disadvantage arises from the fact that the low-voltage terminal of the charge pump has a great deal of current coming out of it. This means that the switch within the regulator must be able to accommodate very high currents. This is most often achieved by making the transistor that implements the switch physically larger, so that the current density at any point within the transistor will be smaller. Unfortunately, with this switch consuming so much of the die area, it can become necessary to use a larger die. This increases cost of manufacture, as well as size of the power converter as a whole.

The operational disadvantage arises from the fact that charge pumps are generally more efficient at executing a voltage transformation than regulators. Although the regulator can also transform voltage, it is not particularly efficient at doing so. Where it excels is in providing fine control over voltage and suppressing current ripple. Thus, when a power converter is asked to transform a first voltage into a second voltage, it is preferable that the charge pump carry out as much of the voltage transformation as possible, and that the regulator do as little of the voltage transformation as possible.

There are two constraints that militate against achieving this. The first constraint is that charge pumps are designed around a particular integer ratio, n/m. Thus, for a given input voltage $V_{in}$, the output voltage $V_{out}$ of a charge pump is $V_{in}*(n/m)$. This ratio is fixed for a particular configuration of the charge pump. Among the regulator's functions is to bridge the gap between the overall factor required to reach a target value of voltage and the factor (n/m) that the charge pump contributes.

The second constraint that arises in known designs is that a minimum voltage margin must exist between the input and output of the regulator. If the regulator is placed at the low-voltage terminal of the charge pump, it is quite possible that the voltage at the output of the charge pump and the target voltage will differ by less than this minimum voltage margin.

For example, if the desired power converter output is 1.0 volt, and $V_{in}$ is 4.2 volts, one can use a charge pump designed with m/n=3 to maintain 1.4 volts at the low voltage output. Although this slightly exceeds the target voltage, the regulator is intended to bridge the gap between the 1.4 volts and the desired 1.0 volts. This is desirable because a large fraction of the required voltage transformation will have been carried out by the more efficient charge pump.

However, if this output is provided to a regulator that requires, for example, a 0.6 volt minimum voltage margin, then it will not be possible to output 1.0 volts. This creates what amounts to a gap in the performance of the power converter.

Of course, this problem can easily be solved by using a charge pump designed with m/n=2 instead. If this is done, the output of the charge pump will be 2.1 volts, which will be enough to provide the 0.6 voltage margin. However, the job of transforming the 2.1 volts into the desired 1.0 volt must now be carried out by the regulator, which is not particularly efficient at doing so.

In a first embodiment, shown in FIG. 1, a power converter 10 transforms a first voltage V1 into a second voltage V2. The power converter 10 includes a regulator 12 and a 3-terminal charge pump 14 in series. The 3-terminal charge pump 14 has a first CP-terminal 16, a second CP-terminal 18, and a third CP-terminal 17.

A regulator controller 13 connected to a regulator-control output 132 controls the switching activity of the regulator 12 based at least in part on feedback from a feedback line 144 connected to the second voltage V2. The regulator controller 13 can, however, rely on other inputs such as a feed-forward line 141, a first intermediate feedback line 142, and a second intermediate feedback line 143. A regulator-control input 131, which can be a digital input or an analog input, enables one to enter a set point for operation of the regulator 12.

Meanwhile, a charge-pump controller 15 that is connected to a charge-pump-control output 152 controls the switching activity of the 3-terminal charge pump 14. A charge-pump-control input 151, which can be a digital input or an analog input, enables one to enter a set point for operation of the 3-terminal charge pump 14.

The power converter 10 further includes a clock 145 connected to both the charge-pump controller 15 and the regulator controller 13 to ensure that switches open and close at the correct time and in synchrony.

For the sake of clarity, the regulator controller 13, the charge-pump controller 15, and the clock 145 have been omitted from certain figures. However, it is understood that they are always implicitly present.

During operation of the 3-terminal charge pump 14, the regulator 12 maintains the first CP-terminal 16 at a high voltage, but has a low current passing through it. The second CP-terminal 18 is maintained at a relatively low voltage by the action of the 3-terminal charge pump 14. Both the first and second CP-terminals 16, 18 share a common ground reference at the third CP-terminal 17.

In particular, for an input voltage $V_h$, at the first CP-terminal 16, the voltage at the second CP-terminal 18 is $V_h*(m/n)$ where m/n is the defining voltage transformation ratio of the particular charge pump. The second CP-terminal 18 will, however, also have a higher current passing through it. In the ideal case, with no loss, the power entering the 3-terminal charge pump 14 should be equal to the power leaving the 3-terminal charge pump 14. This means that the product of high current and low voltage at the second CP-terminal 18 should be equal to the product of high voltage and low current at the first CP-terminal 16.

The 3-terminal charge pump 14 can be implemented using many different charge pump topologies such as Ladder, Dickson, Series-Parallel, Fibonacci, and Doubler. Some of these topologies can be configured such that the ground reference associated with the first CP-terminal 16 and the ground reference associated with the second CP-terminal 18 are different, resulting in a 4-terminal charge pump 74 with four terminals.

Figure 2:
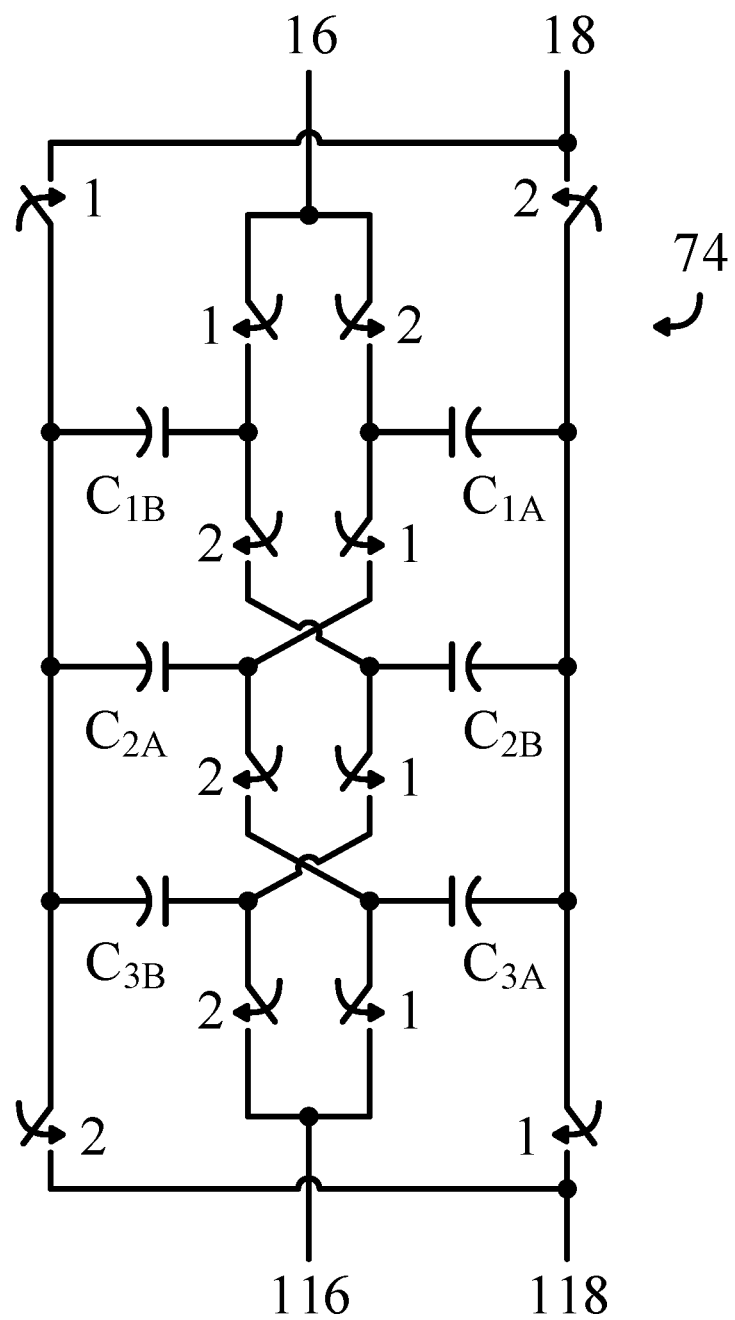
FIG. 2 shows a switched-capacitor charge pump for use with a power converter such as that shown in FIG. 1.

FIG. 2 illustrates a 4-terminal charge pump 74 that is a two-phase variant of the Dickson charge pump, also known as a cascade multiplier. In addition to the first and second CP-terminals 16, 18, the 4-terminal charge pump 74 also includes fourth and fifth CP-terminals 116, 118. Unlike in the 3-terminal charge pump 14, the first and second CP-terminals 16, 18 in the 4-terminal charge pump 74 do not share a common ground reference. Instead, the first CP-terminal 16 has its own ground reference at the fourth CP-terminal 116 and the second CP-terminal 18 has its own ground reference at the fifth CP-terminal 118.

The 4-terminal charge pump 74 features a switching network that causes transitions between first and second states. A switched-capacitor network 21 inside of the 4-terminal charge pump 74 alternates between first and second states depending on which of these switches are open and which ones are closed. A first switch configuration causes the switched-capacitor network 21 to transition from the first state to the second state. A second switch configuration causes the switched-capacitor network 21 to transition from the second state to the first state. Charge pumping action arises as a result of the switches causing the switched-capacitor network 21 to switch between these states.

In operation, different amounts of current will flow through different switches. It is therefore useful to size the switches in a manner appropriate to the currents that will be flowing through them. For example, the switches connected to the second and fifth CP-terminals 18, 118 carry more current then the other switches in FIG. 2. By making these switches larger than the other switches one avoids the need to have unnecessarily large switches and thus results in a smaller circuit footprint. This also avoids unnecessary additional capacitive losses, which are proportional to the size of the switch.

Figure 3A:
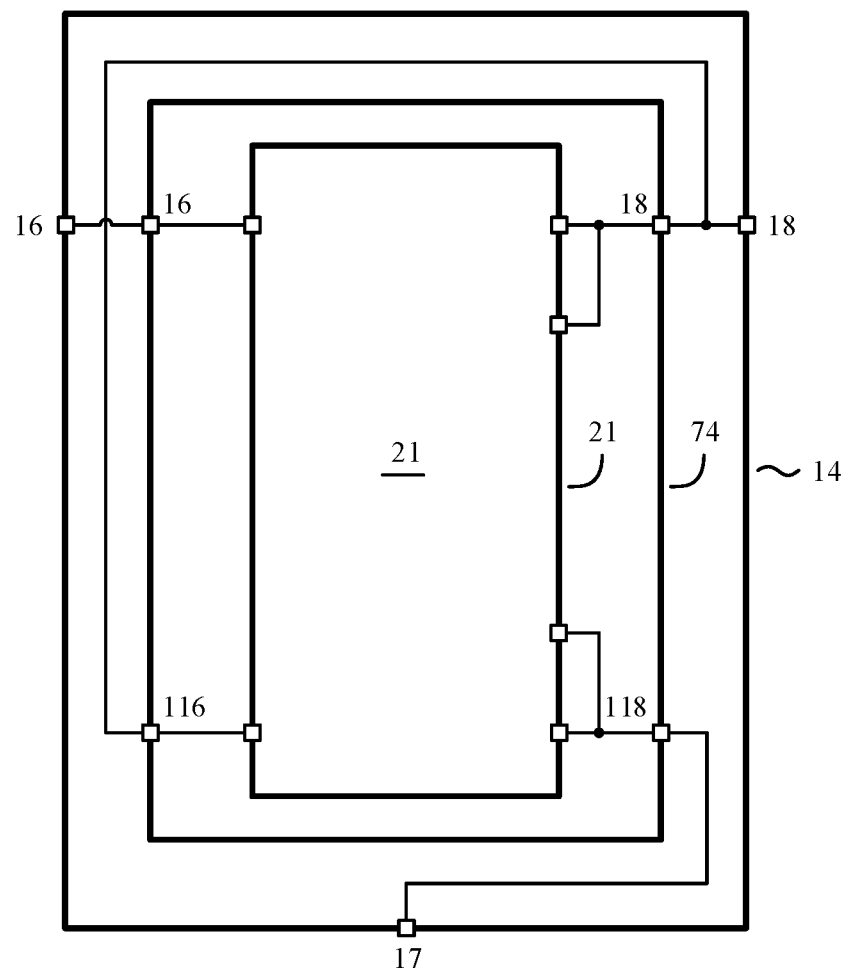
FIG. 3A shows terminals that connect to the various capacitor networks that will be formed and unformed as the charge pump of FIG. 2 transitions through its various states.

FIG. 3A shows the terminals that will connect to a switched-capacitor network 21 of the 4-terminal charge pump 74. The 4-terminal charge pump 74 is constantly transitioning between states, each of which is a different capacitor network. In the discussion that follows, the switched-capacitor network 21 shown in FIG. 2 will only be shown in one state or the other. As a result, the proliferation of switches shown in FIG. 2 will no longer need to be shown.

Figure 3C:
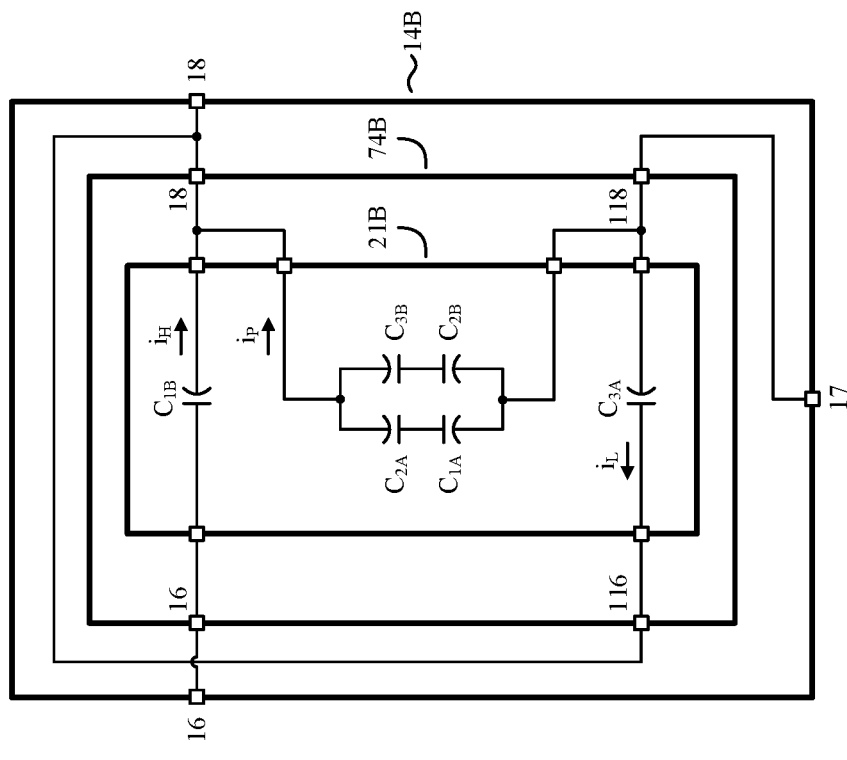
FIG. 3C shows a second capacitor network corresponding to a second configuration of switches for the charge pump of FIG. 2.
Figure 3B:
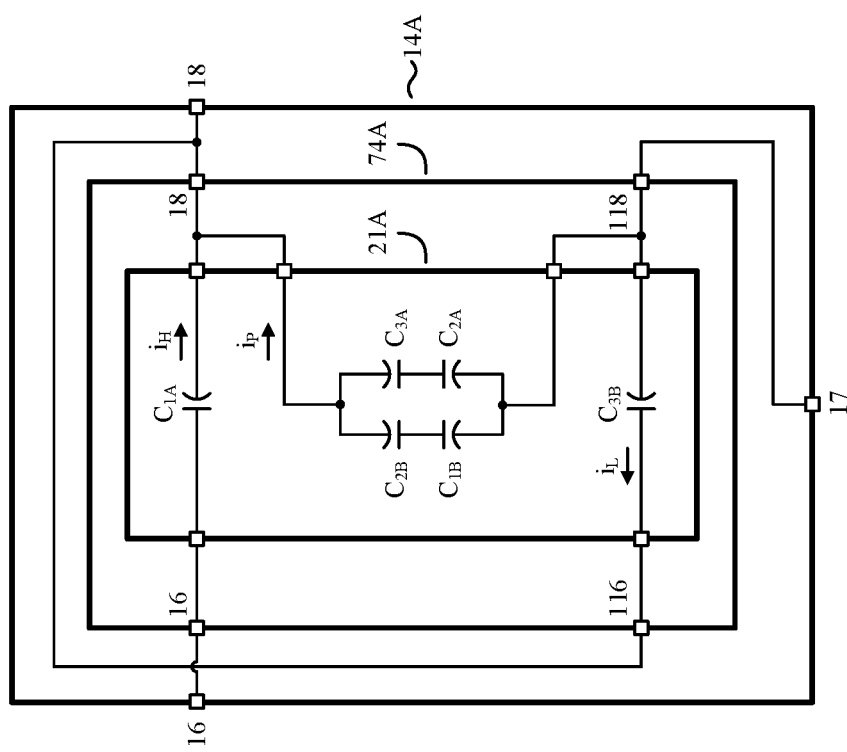
FIG. 3B shows a first capacitor network corresponding to a first configuration of switches for the charge pump of FIG. 2.

Of course, no one state can be said to actually define the 4-terminal charge pump 74 any more than it is possible to identify one frame that defines a movie. In recognition of this, the switched-capacitor network 21 is shown as a blank screen in FIG. 3A. Either a first state 21A or a second state 21B will be projected into this blank screen. The actual switched capacitor network that exists in FIG. 3A will depend on exactly when one looks at it. Sometimes, the switched-capacitor network 21 will be in its first state 21A, as shown in FIG. 3B, and sometimes it will be in its second state 21B, as shown in FIG. 3C.

The first and second states 21A, 21B are essentially symmetric. Although the topology appears the same, a close examination of FIGS. 3B and 3C will reveal that the capacitors have switched places. This switching places is what the switches shown in FIG. 2 accomplish.

Figure 4:
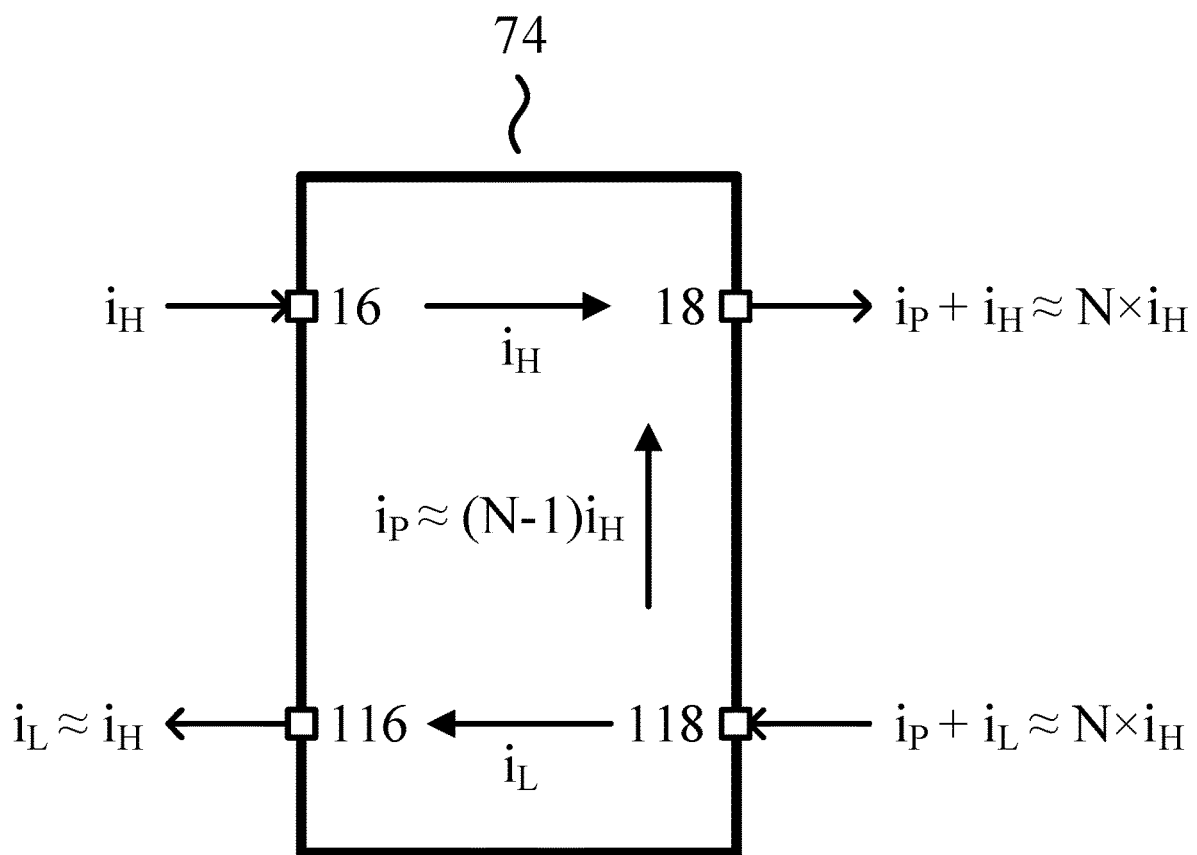
FIG. 4 shows a block diagram of the 4-terminal charge pump of FIG. 2.

In the 4-terminal charge pump 74 shown in FIG. 4, there are three internal charge-transport paths. A first charge-transport path, between the fifth CP-terminal 118 and the second CP-terminal 18 carries a first current, $i_P$. This first charge-transport path carries the highest current. A second charge-transport path between the first CP-terminal 16 and the second CP-terminal 18 carries a second current, $i_H$. A third charge-transport path between the fifth CP-terminal 118 and the fourth CP-terminal 116 carries a third current, $i_L$. The current present at the second CP-terminal 18 is thus the sum $(i_P+i_H)$. This is approximately equal to $N*i_H$, where N depends on the topology of the switched-capacitor network 21. In this embodiment, the grounds are not completely isolated because there is a charge-transport path between them.

The 3-terminal charge pump 14 can be created from the 4-terminal charge pump 74 by shorting the fourth CP-terminal 116 to the second CP-terminal 18 and by shorting the fifth CP-terminal 118 to the third CP-terminal 17 of the 3-terminal charge pump 14. A block diagram of the resulting charge pump is shown in FIG. 5.

Figure 5:
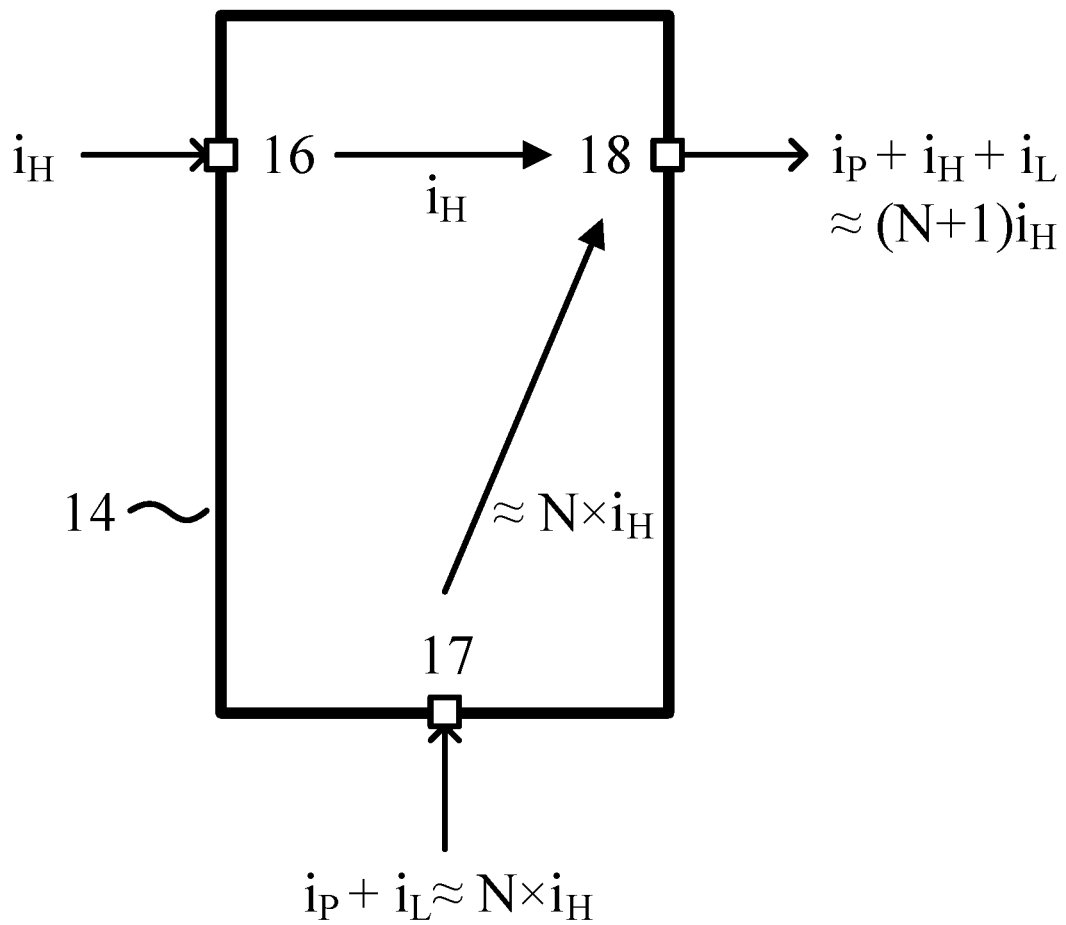
FIG. 5 shows a block diagram of the 3-terminal charge pump of FIG. 3A.

It is apparent from FIG. 5 that there are two internal charge-transport paths within the 3-terminal charge pump 14. A first charge-transport path, between the third CP-terminal 17 and the second CP-terminal 18 carries a first current, $i_P+i_L$. This first charge-transport path carries the highest current. A second charge-transport path between the first CP-terminal 16 and the second CP-terminal 18 carries a second current, $i_H$. The current present at the second CP-terminal 18 is thus the sum $(i_P+i_H+i_L)$. This is approximately equal to $(N+1)i_H$, wherein N depends on the topology of the switched-capacitor network 21.

In the embodiment shown in FIG. 1, the regulator 12 is placed between the first voltage V1 to be transformed and the first CP-terminal 16 of the 3-terminal charge pump 14. This hinders the regulator's ability to promote adiabatic inter-capacitor charge transport among the capacitors in the 3-terminal charge pump 14. To improve this ability, it is preferable to connect the regulator 12 to the second CP-terminal 18.

The desirability of placing the regulator 12 at the second CP-terminal 18 is apparent from FIGS. 3B-3C. An examination of the network topology reveals that an inductor coupled to the second CP-terminal 18 would be coupled to all capacitors in the switched-capacitor network 21. Therefore, it will be able to influence all three charge-transport paths simultaneously. In contrast, an inductor coupled to the first CP-terminal 16 will only be able to affect the second charge-transport path between the first CP-terminal 16 and the second CP-terminal 18. To make matters worse, the second charge-transport path does not carry nearly as much current as the first charge-transport path between the fifth CP-terminal 118 and the second CP-terminal 18. Thus, to reduce loss, it is more important to influence the first charge transport path.

In the configuration shown in FIG. 1, the regulator 12 has been partially side-lined. It can still regulate the current at the second CP-terminal 18. But it has lost its ability to promote adiabatic inter-capacitor charge transport.

However, having the regulator 12 connected to the first CP-terminal 16 instead of the second CP-terminal 18 is not without its advantages. In particular, at the first CP-terminal 16, only a small current, $i_H$, flows through regulator 12. This means that the various components in the regulator 12 no longer have to be sized to accommodate the larger current, $(i_H+i_P)$, present at the second CP-terminal 18.

Figure 6A:
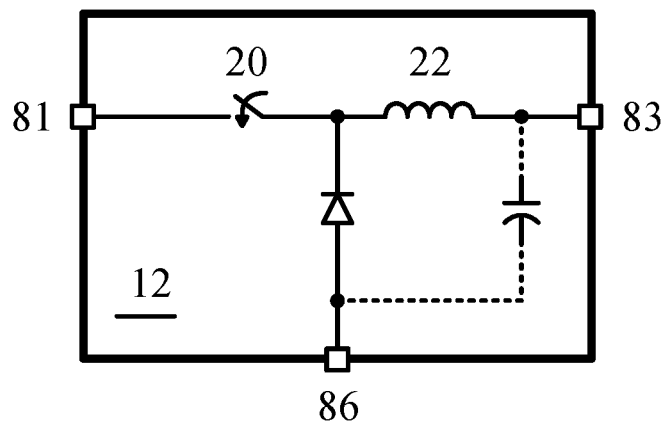
FIG. 6A shows the components of a typical regulator that can be used in a power converter such as that shown in FIG. 1.

In particular, in a common embodiment of a regulator 12, such as that shown in FIG. 6A, a switch 20 periodically connects an inductor 22 into a first state and into a second state according to a duty cycle. This switch 20 ultimately bears the full brunt of the current passing through the regulator 12. Since practical switches 20 are implemented with semiconductor materials, there is some risk that the switch 20 will overheat. Since the heat produced in a bulk material is the product of resistivity and current density, one way to reduce excessive heating of a semiconductor switch 20 so that it can accommodate large amounts of current is to simply spread the current over a larger area of semiconductor material, thus lowering the current density. However, this results in a switch 20 that consumes a great deal of area on a semiconductor die.

Figure 6B:
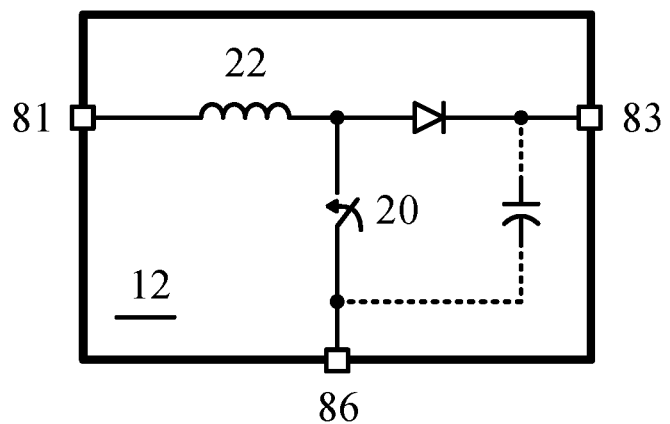
FIGS. 6B-6D show alternative regulators for use with a power converter such as that shown in FIG. 1.
Figure 6C:
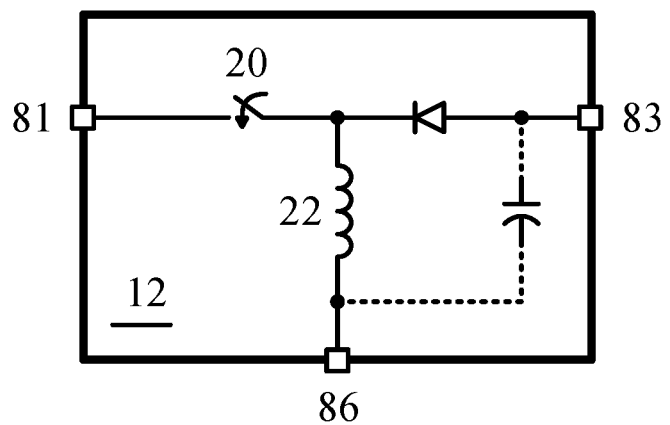
Figure 6D:
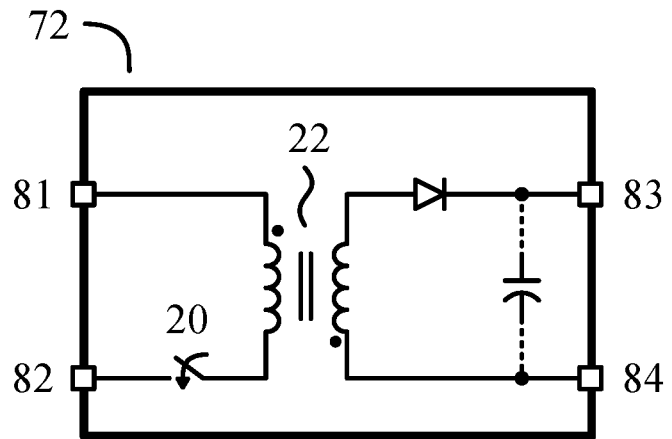

Many other regulator configurations have such a switch 20 that periodically connects an inductor into a first state and into a second state to regulate. Other examples are shown in FIGS. 6B-6D, which features a boost converter in FIG. 6B, a boost-buck converter in FIG. 6C, and a Flyback converter in FIG. 6D. Although these regulators are somewhat different in topology, they all feature a switch 20 that modulates an inductor 22 (or transformer). Other suitable regulators not shown, include Flyback converters, quasi-resonant Flyback converters, active-clamp Flyback converters, interleaved Flyback converters, Cuk converters, SEPIC converters, resonant converters, multi-level converters, Forward converters, two-switch Forward converters, active-clamp Forward converters, interleaved Forward converters, multi-Resonant Forward converters, Half-Bridge converters, asymmetric Half-Bridge converters, multi-resonant Half-Bridge converters, LLC resonant Half-Bridge converters, and Full-Bridge converters.

As a result of having connected the regulator 12 to the first CP-terminal 16 as shown in FIG. 1, the switch 20 needs only to accommodate a smaller current than it would have had to accommodate had it been connected to the second CP-terminal 18. Of course, the switch 20 may need to be designed to accommodate the high voltage at the first CP-terminal 16. However, this trade-off is usually favorable in most designs.

Another advantage of connecting the regulator 12 to the first CP-terminal 16 is that the inductor 22 does not need as large of an inductance as it would have had it been connected to the second CP-terminal 18. This reduces the dc resistance of the inductor 22 and thus reduces energy losses associated with the current through the inductor 22.

Adiabatic inter-capacitor charge transport remains desirable no matter where the regulator 12 is placed. With the inductor 22 within the regulator 12 no longer available for this purpose, it is necessary to add another component to the power converter 10. This results in an increase in the component count and a resultant increase in circuit complexity.

To promote adiabatic intra-capacitor charge transport within the 3-terminal charge pump 14, the illustrated embodiment in FIG. 1 features a magnetic filter 24 that is connected to the second CP-terminal 18. The magnetic filter 24 includes an inductor that tends to promote adiabatic inter-capacitor charge transport within the 3-terminal charge pump 14.

The switches shown in FIG. 2 will transition between states at some switching frequency. It is desirable that, in order to reduce loss, the charge pump 14 operate adiabatically at that switching frequency. One way to ensure that this is the case is to choose the resistances of the switches such that they are so large that the RC time constant of the charge transfer between the capacitors is similar if not longer than the switching frequency. Unfortunately, this increases the resistive losses. The magnetic filter 24, allows us to reduce the resistance of the switches without incurring substantial redistribution loss and thereby operate adiabatically. Therefore, the switches can be optimally sized for the highest efficiency without worrying about redistribution loss. The optimal size for each switch is chosen by balancing the resistive and capacitive losses in each switch at a given switching frequency and at a given current.

Yet another advantage of connecting the regulator 12 to the first CP-terminal 16 arises with certain dynamically reconfigurable charge pumps.

In some cases, it is possible for the first voltage V1 shown in FIG. 1 to fluctuate considerably. There may be times, for example, where the voltage drops enough so that the voltage across the regulator 12 is insufficient for proper operation. This requires reducing the voltage transformation ratio of the 3-terminal charge pump 14, thus providing enough slack voltage for the regulator 12 to work with. Such dynamic reconfiguration can be carried out using charge pumps, such as those described in U.S. Pat. No. 8,817,501.

When a charge pump is in a new configuration, the voltages across the capacitors in the charge pump may have to change to be appropriate to the new configuration. This change often has to occur rapidly. A rapid change in capacitor voltage requires a very large current.

For some charge pumps, the capacitor voltages are set by whatever is present at the second CP-terminal 18. An example of such a configuration is the one shown in FIGS. 3A-3C, where it is apparent that the voltage across the capacitors is a function of the voltage between the second CP-terminal 18 and the third CP-terminal 17. For these charge pump configurations, a dynamic reconfiguration may draw considerable current through the first CP-terminal 16 as the charge pump begins to operate in its new configuration.

Placing the regulator 12 before the 3-terminal charge pump 14 as illustrated in FIG. 1, and carefully synchronizing the operation of the regulator 12 with the dynamic reconfiguration of the 3-terminal charge pump 14, can avoid this disturbance. In particular, while the 3-terminal charge pump 14 is in the old configuration, the regulator 12 supplies a first intermediate voltage to the 3-terminal charge pump 14 via the first CP-terminal 16. Then, during the brief interval that reconfiguration is actually taking place, the regulator 12 is quickly adjusted so that instead of providing the first intermediate voltage, it provides a second intermediate voltage that is more appropriate for the charge pump's new configuration. Once dynamic reconfiguration is complete, the 3-terminal charge pump 14 resumes operation. However, by this time, the regulator 12 is already ready and waiting to supply it with the correct second intermediate voltage at the first CP-terminal 16.

Figure 7A:
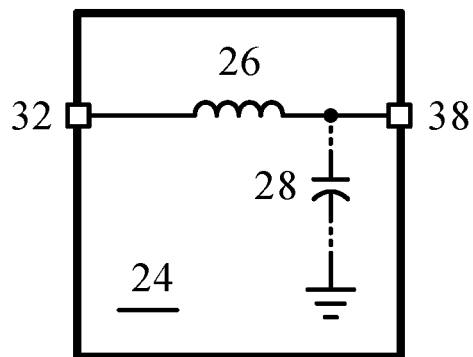
FIGS. 7A-7B show magnetic filters that can be used in the embodiment of FIG. 1.

The magnetic filter 24 can be created in many different ways. FIG. 7A shows one implementation of the magnetic filter 24 that features a first inductor 26 and, optionally, a capacitor 28.

Figure 7B:
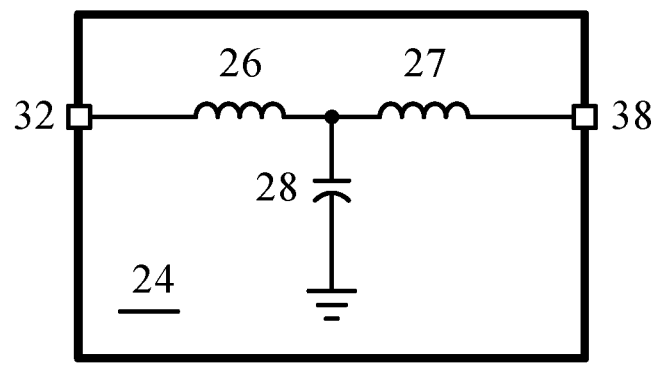

FIG. 7B shows an alternative magnetic filter 24 that features an a second inductor 27 in addition to the first inductor 26 and the capacitor 28. This embodiment of the magnetic filter 24 is a third order low pass filter and therefore, more effective than the magnetic filter 24 in FIG. 7A at attenuating high frequencies.

A charge pump is constantly opening and closing one or more switches. It is important, particularly when an inductor is present in a circuit, that whenever a switch is opened, current flowing in the circuit have someplace to go. Otherwise it may damage the switch.

Between the first state and the second state of a charge pump (e.g., the 3-terminal charge pump 14), there is a dead-time interval during which all of the switches in the switched-capacitor network 21 are open. Although not, in principle, required, this dead-time interval is a practical necessity because switches do not transition instantaneously. Thus, it is necessary to provide a margin to avoid the undesirable result of having switches closed at the same time.

Figure 8:
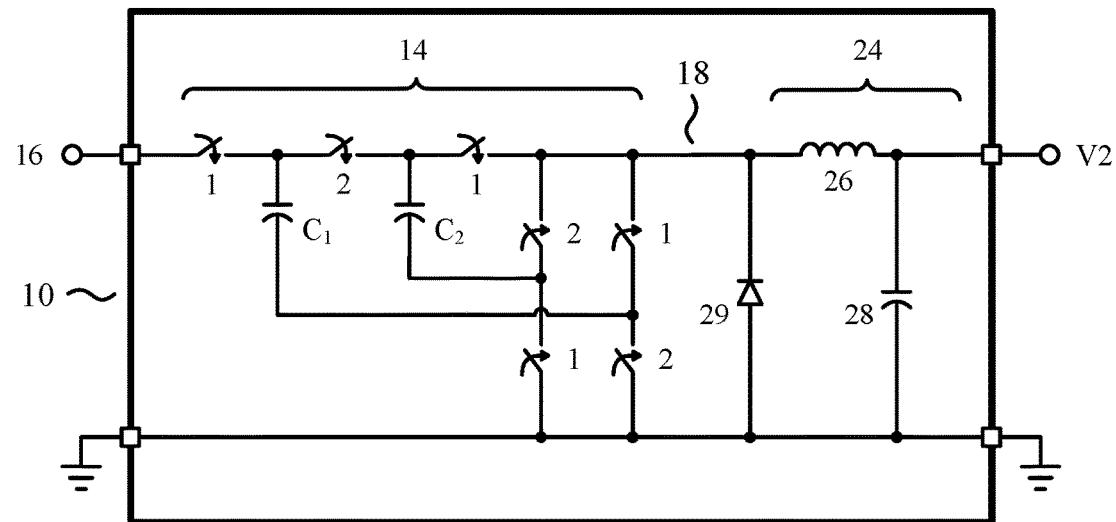
FIG. 8 shows an embodiment in which a diode is used to conduct current in a magnetic filter that has no place to go during the dead time of the charge pump.

In a preferred embodiment, a magnetic filter 24 connected to the second CP-terminal 18 in a power converter 10 is modified to include a circuit element to safely shunt current that would otherwise have no place during the dead-time of the 3-terminal charge pump 14. In one such embodiment shown in FIG. 8, a shunt diode 29 is used to direct such current. Alternatively, if the dead-time interval in the switched-capacitor network 21 does not last too long, a shunt capacitor can be connected to ground to temporarily store excess charge during that interval and to release it once the switches have been properly reconnected. In some cases, a switch is placed in series with the shunt capacitor so that the shunt capacitor can be disconnected from the circuit when it is not needed. This avoids having the shunt capacitor interfere with circuit operation.

Figure 9:
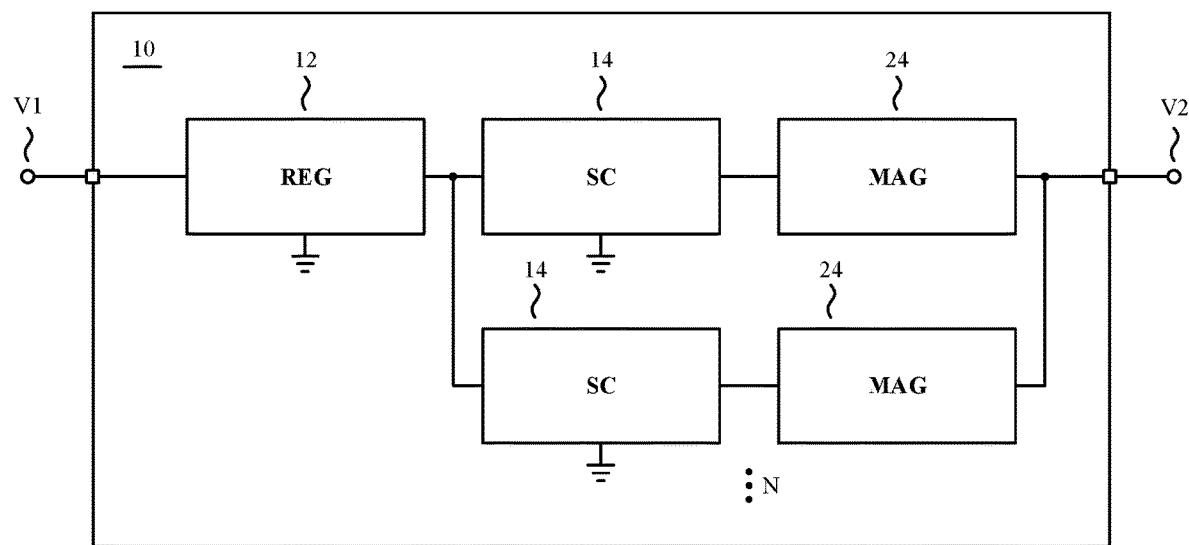
FIG. 9 shows the power converter of FIG. 1 but with parallel charge pumps and parallel magnetic filters.

FIG. 9 shows a variant of the power converter 10 in FIG. 1 in which the output of a regulating circuit 12 connects to multiple 3-terminal charge pumps 14 in parallel. Each 3-terminal charge pump 14 has a corresponding magnetic filter 24 at its second CP-terminal 18. The outputs of each magnetic filter 24 are then combined at a common node, which is a second voltage V2 of a power converter 10.

Figure 10:
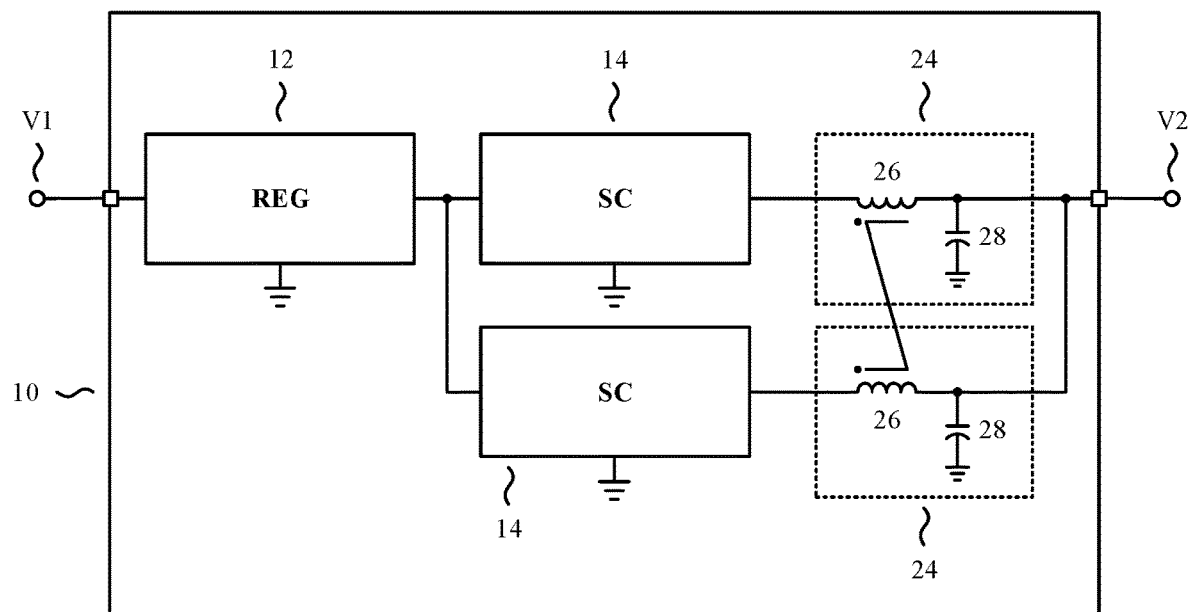
FIG. 10 shows the power converter of FIG. 9 but with the magnetic filters sharing a common inductor.

FIG. 10 shows a variant of the embodiment in FIG. 9 in which the magnetic filters 24 are constructed using a coupled inductor 26. The coupled inductor 26 is constructed by having two windings sharing a common core.

Figure 11:
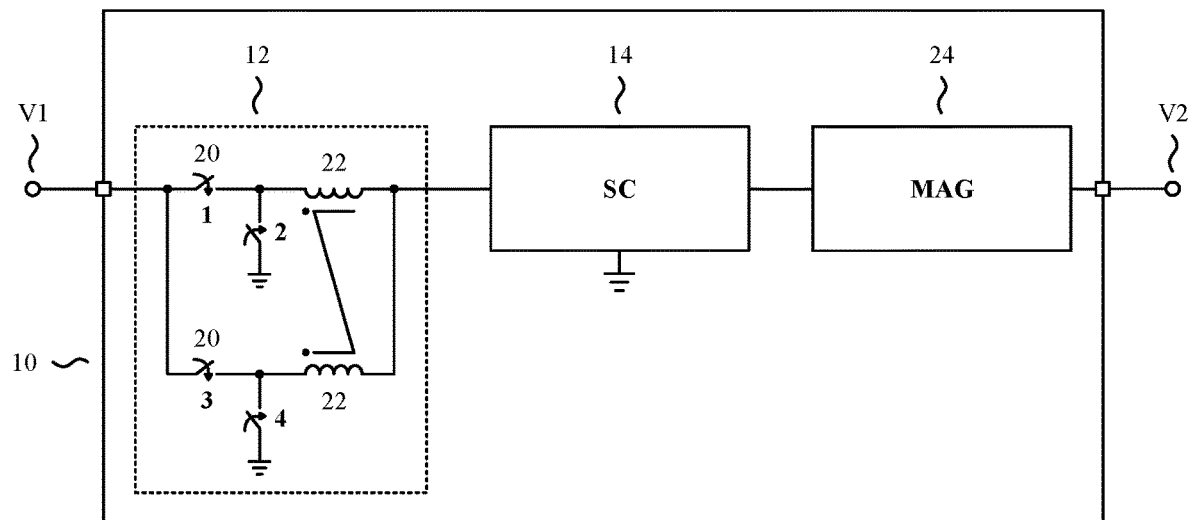
FIG. 11 shows the power converter of FIG. 1 but with the regulator having switches that share a common inductor.

The idea of a coupled inductor as shown in FIG. 10 can also be used in the regulator 12. This is shown in FIG. 11, in which a regulator 12 such as that shown in FIG. 6A is opened up to reveal a coupled inductor 22 shared by two switches 20.

Figure 12:
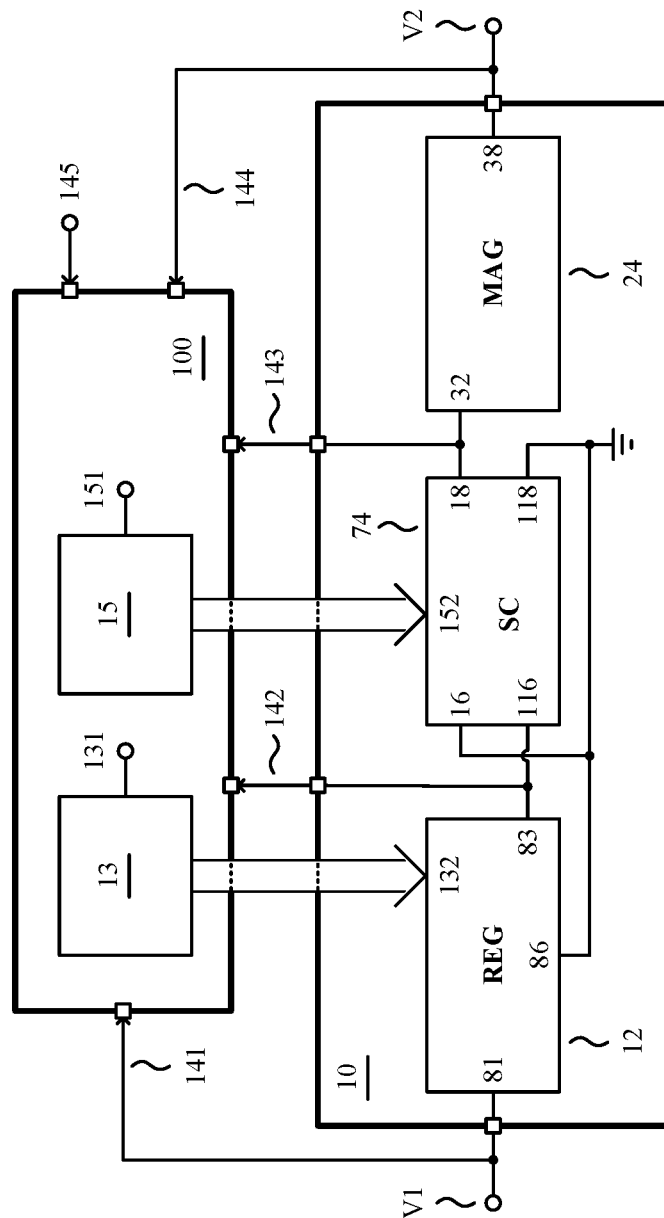
FIG. 12 shown an embodiment similar to that shown in FIG. 1 but with a four-terminal charge pump.

FIG. 12 illustrates yet another embodiment in which a regulator 12, a 4-terminal charge pump 74, and a magnetic filter 24 are connected in series. However, unlike the embodiment in FIG. 1, the 4-terminal charge pump 74 is used instead of the 3-terminal charge pump 14. This 4-terminal charge pump 74 is a four-terminal charge pump, rather than a three-terminal charge pump 14 as shown in FIG. 1. Since there are more terminals, there are more options for interconnection. For example, in the particular example shown, as a result of the orientation of the grounds, the first and second voltages V1, V2 are of opposite polarity. This provides a simple way to change the polarity of an input voltage without having any additional stages (e.g, a polarity inverting stage).

In the embodiments discussed thus far, all power that passes through the power converter 10 flows through both the regulator 12 and the 3-terminal charge pump 14. However, in certain embodiments, the power path is bifurcated within the power converter so that some of the power bypasses the regulator 12 altogether.

Figure 13:
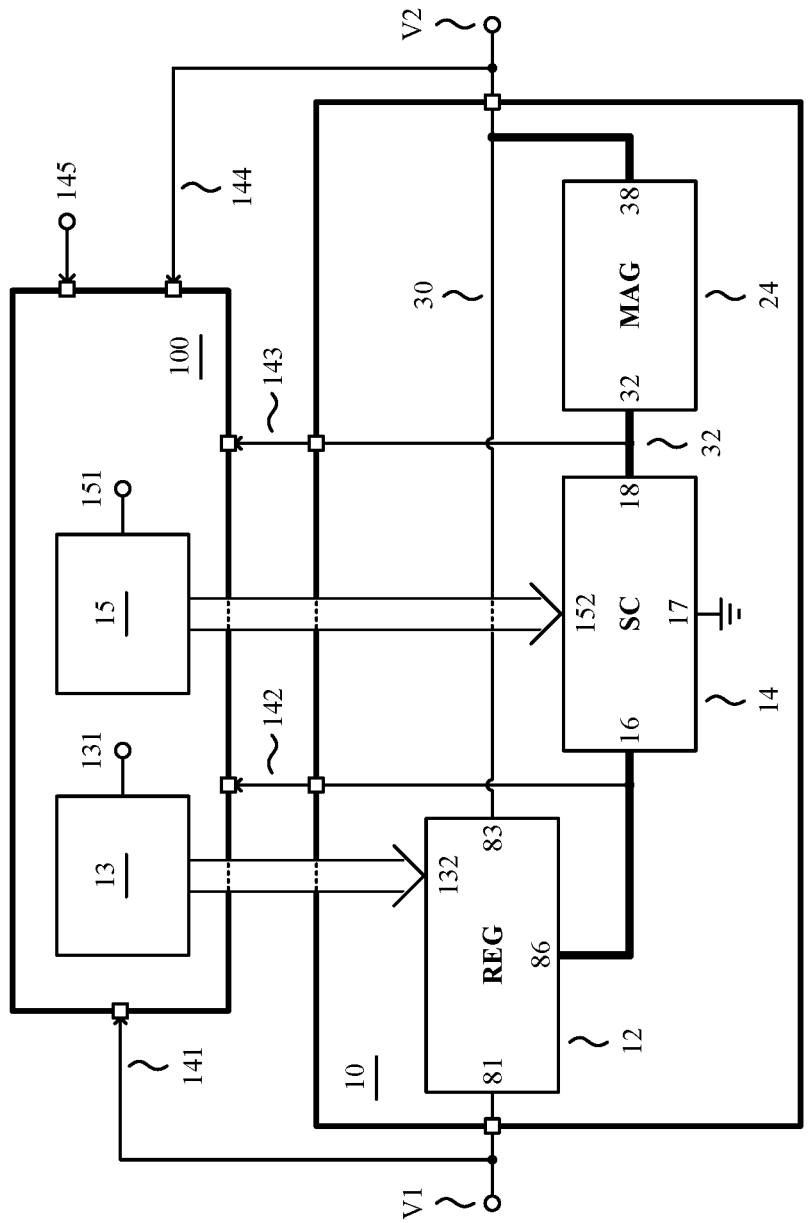
FIG. 13 shows an embodiment having a bifurcated power path through the power converter.

FIG. 13 shows one embodiment that achieves a bifurcated power path, one of which carries more power than the other. In FIG. 13, a first power path 30 and a second power path 32 traverse the power converter 10. The heavier line on the second power path 32 indicates that it carries the higher of the two powers. Conversely, the lighter line on the first power path 30 indicates that this path carries the lower of the two powers.

The second power path 32 carries power that goes through the 3-terminal charge pump 14. Meanwhile, the first power path 30 passes through the regulator 12, bypassing the 3-terminal charge pump 14 in the process. Because the 3-terminal charge pump 14 is more efficient at executing a voltage transformation, it is desirable for most of the power to use the second power path 32.

An additional advantage to a bifurcated power path is that the regulator 12 can be used to provide an additive offset to the voltage difference across the first CP-terminal 16 and third CP-terminal 17 of the 3-terminal charge pump 14. As a result, there is an extra degree of freedom available for controlling the voltage at the output of the power converter 10. This provides greater flexibility and thus fewer voltage ranges at which the power converter 10 will not be able to provide a desired output voltage.

In the embodiment shown in FIG. 13, the voltage at an output 83 of the regulator 12 is the same as that at the output 38 of the magnetic filter 24. This is achieved by connecting the ground terminal 86 of the regulator 12 to the first CP-terminal 16 of the 3-terminal charge pump 14. The output 83 of the regulator 12 that was connected to the first CP-terminal 16 in FIG. 1 is then connected to the output 38 of the magnetic filter 24 instead.

Figure 14A:
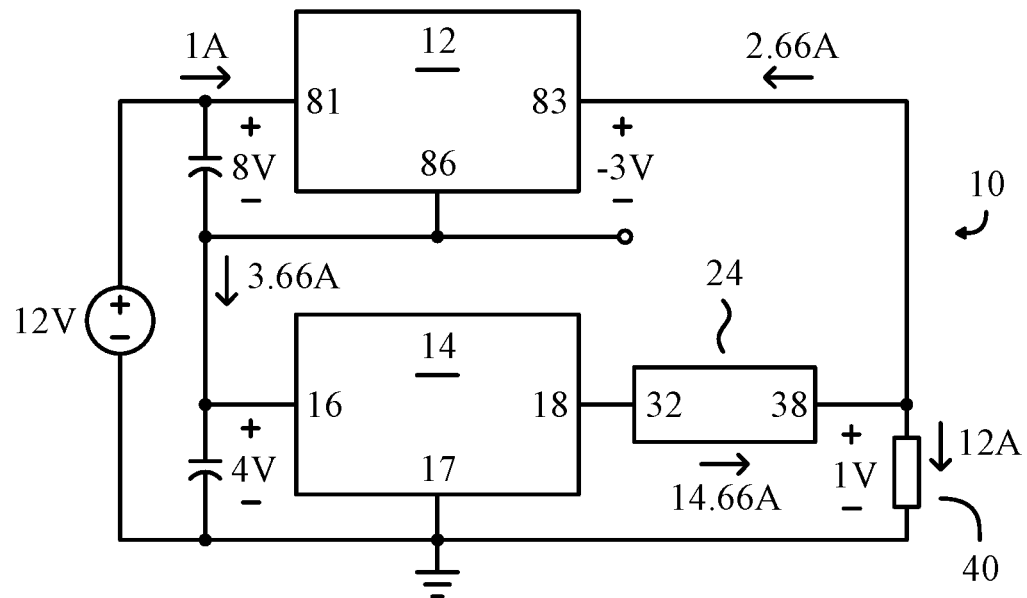
FIG. 14A shows a circuit that implements the bifurcated power path of FIG. 13, with the input voltage split so that the voltage presented to the regulator is twice that presented to the charge pump.

FIG. 14A shows an exemplary circuit that uses the configuration of FIG. 13 to transform a 12-volt input voltage into a 1-volt output at a load 40. A 4-volt input is provided at the first CP-terminal 16 of the 3-terminal charge pump 14. The 3-terminal charge pump 14, being a 4:1 charge pump, outputs 1 volt at its second CP-terminal 18.

Meanwhile, the remaining 8 volts is presented across the input terminal 81 and ground terminal 86 of the regulator 12, which presents −3 volts at the output 83 of regulator 12. However, this −3 volts is measured relative to the ground of the regulator 12, which is not the same as that of the 3-terminal charge pump 14. Because the ground terminal 86 of the regulator 12 is connected to the first CP-terminal 16 of the 3-terminal charge pump 14, it too must be at 4 volts. Therefore, the voltage measured at the output 83 of the regulator 12 would actually be 1 volt (i.e. 4-3) when measured relative to the ground of the 3-terminal charge pump 14. As a result, the voltage at the output 83 of the regulator 12 and the output 38 of the magnetic filter 24 will be the same at the load 40, as they should be.

Figure 14B:
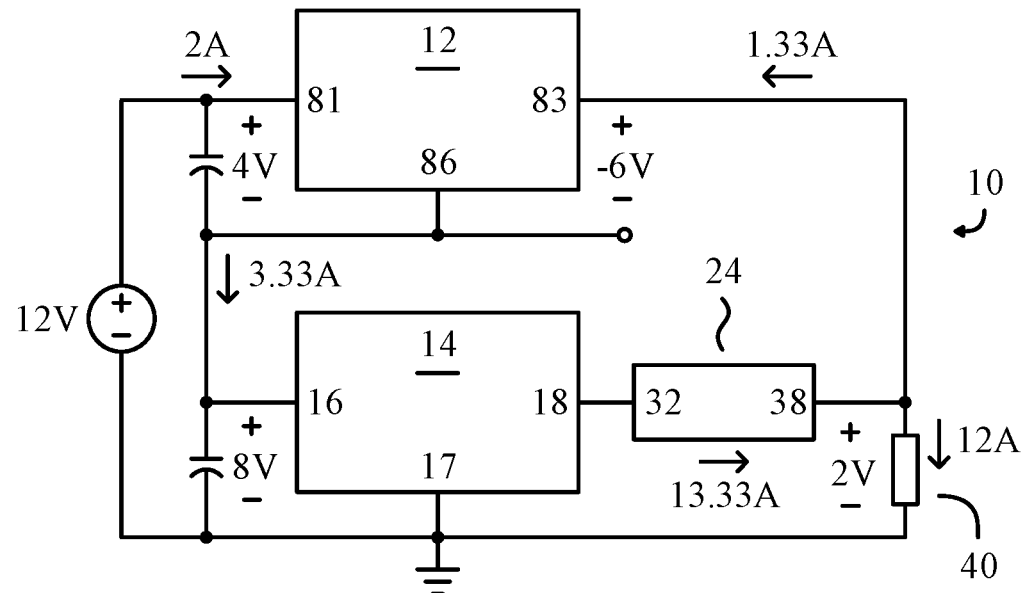
FIG. 14B shows a circuit that implements the bifurcated power path of FIG. 13, with the input voltage split so that the voltage presented to the regulator is half that presented to the charge pump.

FIG. 14B shows the circuit of FIG. 14A being used to transform a 12-volt input voltage into a 2-volt output at a load 40. Unlike the circuit in FIG. 14A, the voltage presented to the regulator 12 is half that presented to the 3-terminal charge pump 14 instead of the other way around.

In operation, an 8-volt input is provided at the first CP-terminal 16 of the 3-terminal charge pump 14. The 3-terminal charge pump 14, being a 4:1 charge pump, outputs 2 volts at its second CP-terminal 18 as required.

Meanwhile, the remaining 4 volts is presented across the input terminal 81 and ground terminal 86 of the regulator 12, which presents −6 volts at the output 83 of the regulator 12. However, this −6 volts is measured relative to the ground of the regulator 12, which is not the same as that of the 3-terminal charge pump 14. Because the ground terminal 86 of the regulator 12 is connected to the first CP-terminal 16 of the 3-terminal charge pump 14, it too must be at 8 volts. Therefore, the voltage measured at the output 83 of the regulator 12 would actually be 2 volts (i.e. 8-6) when measured relative to the ground of the 3-terminal charge pump 14. As a result, the voltages at the output 83 of the regulator 12 and the output 38 of the magnetic filter 24 at the load 40 will be the same, as they should be.

With isolated charge pumps, such as a 4-terminal charge pump 74, it becomes possible to create alternative architectures for bifurcating the power path where only a portion of the total power passes through the regulator 12. FIG. 15 shows such an architecture.

Figure 15A:
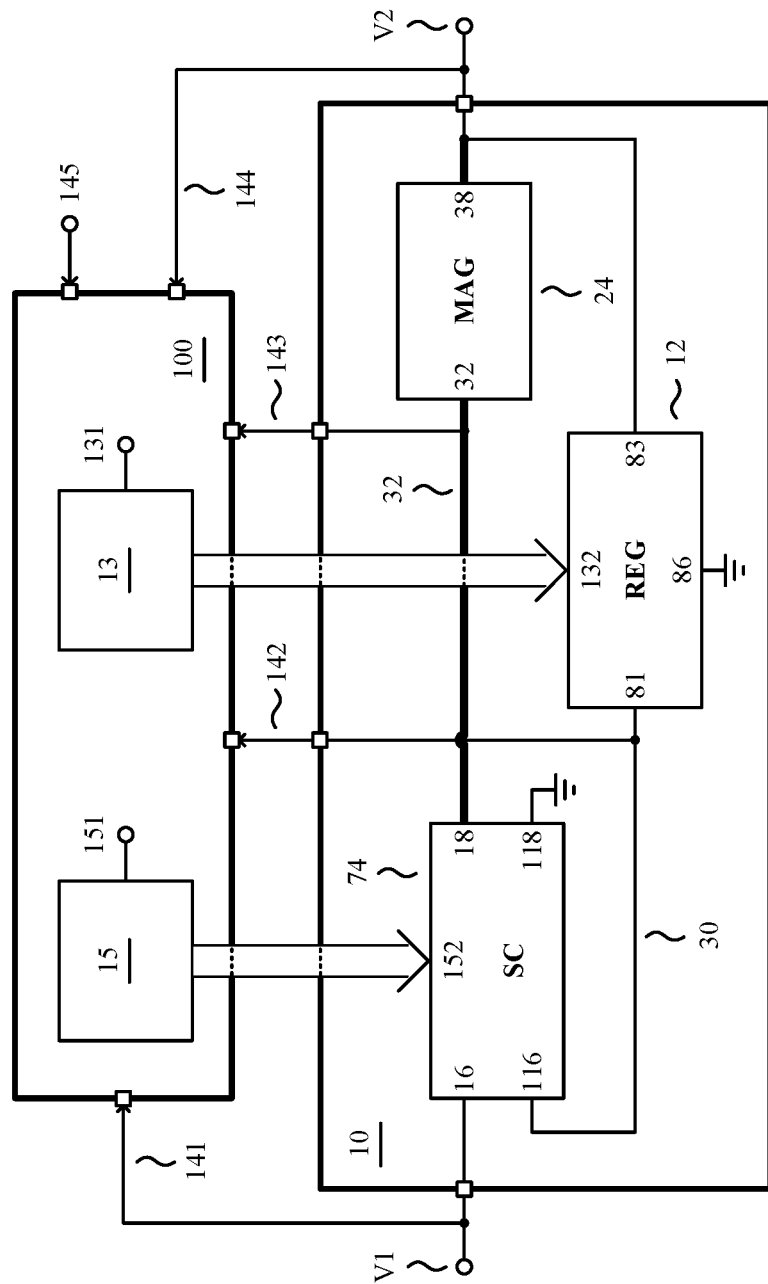
FIG. 15A, shows another embodiment having a bifurcated power path through a power converter.

Referring to FIG. 15A, the first power path 30 starts at the fourth CP-terminal 116 and leads to the input terminal 81 of the regulator 12 while the second power path 32 starts at the second CP-terminal 18 and leads to a magnetic filter 24. The bulk of the power goes through the second power path 32. This configuration is advantageous because the regulator 12 no longer has to bear the brunt of carrying all the power that goes through the power converter 10. As was the case in FIG. 13, the output 83 of the regulator 12 and the output 38 of the magnetic filter 24 meet at a common node, a second voltage V2 of the power converter 10, to which a load 40 will be connected.

Figure 15B:
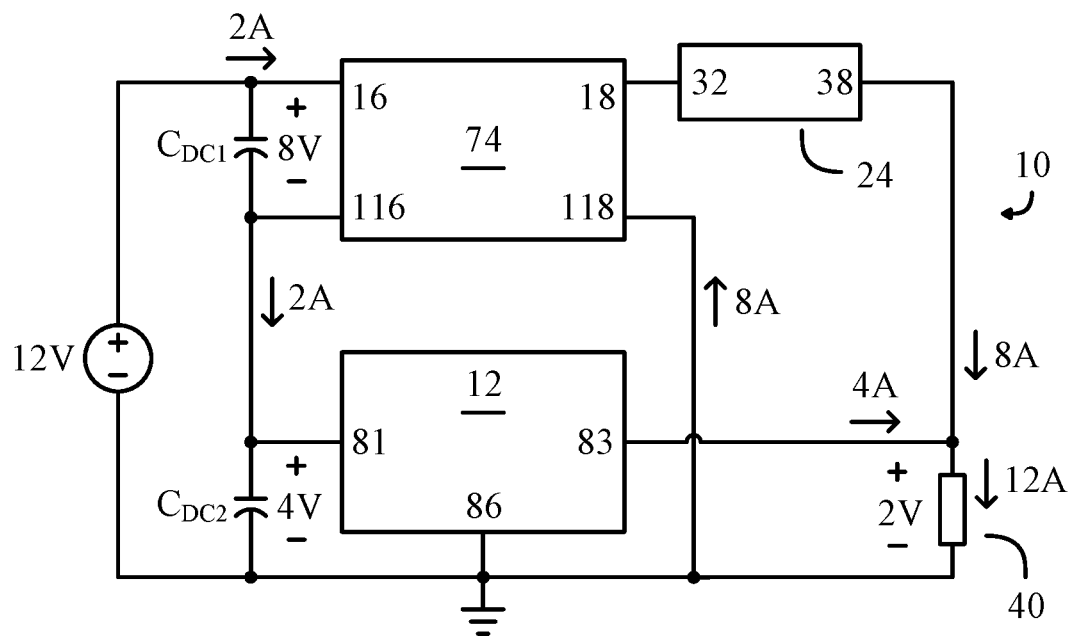
FIG. 15B shows a circuit that implements the bifurcated power path of FIG. 15A.

FIG. 15B is an implementation of the embodiment shown in FIG. 15A. The configuration shown is analogous to that shown in FIG. 14B except that in FIG. 15B, it is the regulator that is grounded and the charge pump that floats.

Embodiments of the type shown in FIG. 15A require that the regulator 12 and 4-terminal charge pump 74 have separate grounds. This requires a fully-isolated version of the 4-terminal charge pump 74, an example of which is shown in FIG. 16A.

Figure 16A:
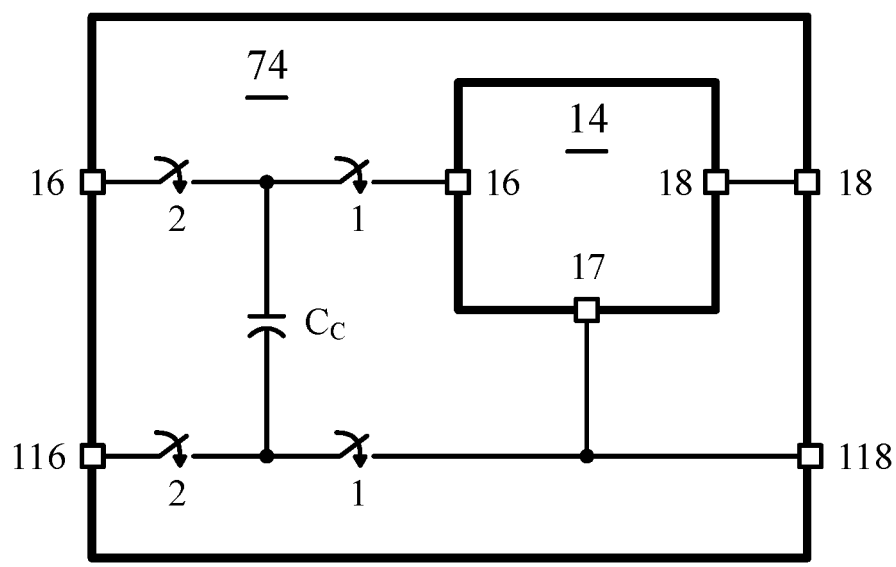
FIG. 16A shows an isolated charge pump that is suitable for use with the architecture shown in FIG. 15A.

In operation, the fully-isolated version of the 4-terminal charge pump 74 shown in FIG. 16A transitions between a first state and a second state. During the first state, switches in a first switch-set 1 open and switches in a second switch-set 2 close. During the second state, switches in the second switch-set 2 open and switches in the first switch-set 1 close.

While the 4-terminal charge pump 74 is in its first state, a coupling capacitor $C_C$ that stores charge sufficient for maintaining the voltage across the first CP-terminal 16 and the fourth CP-terminal 116. Then, when the charge pump 74 transitions into its second state, the coupling capacitor $C_c$ presents its maintained voltage to the 3-terminal charge pump 14 contained within the 4-terminal charge pump 74.

Figure 16B:
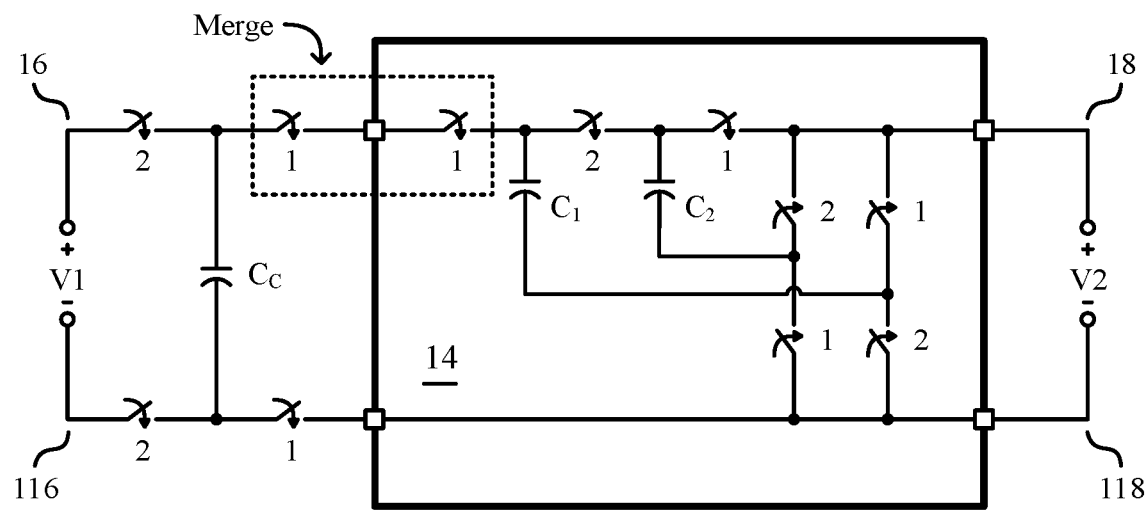
FIG. 16B shows a single-phase implementation of the isolated charge pump shown in FIG. 16A.
Figure 16C:
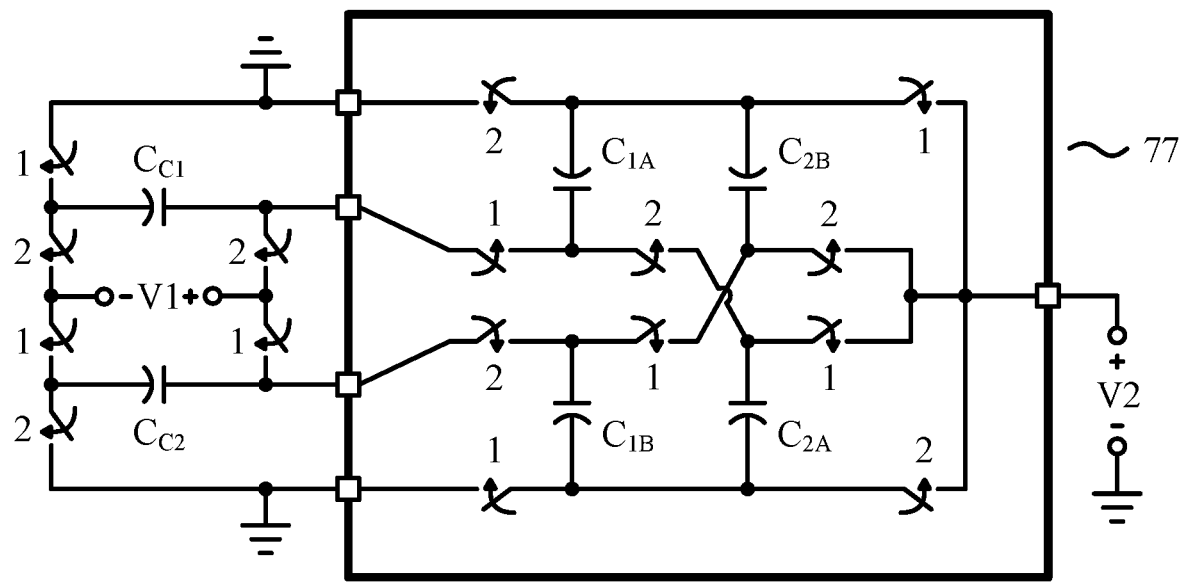
FIG. 16C shows a two-phase implementation of the isolated charge pump shown in FIG. 16A.

This method will work for any type of charge pump topology, two examples of which are shown in FIGS. 16B and 16C.

In particular, FIG. 16B shows the architecture of the charge pump 74 in FIG. 16A in use with a cascade multiplier type similar to the charge pump in FIGS. 3A-3C, the difference being that the voltage transformation ratio is different and the number of phases is different.

FIG. 16C is a two-phase version of the 4-terminal charge pump 74 in FIG. 16B. In contrast to the implementation shown in FIG. 16B, this implementation can draw continuous input current. This results in the ability to reduce the size of first and second DC capacitors $C_{DC1}$, $C_{DC2}$ in FIG. 15B.

The particular implementations shown in FIGS. 16B and 16C have switch pairs with switches that belong to the same switch set and that are in series. For example, the embodiment in FIG. 16B has one such switch pair between the coupling capacitor $C_c$ and pump capacitor $C_1$. Since the switches in each of these switch pairs belong to the first switch-set 1, they always open and close together. Thus, it is possible to eliminate additional switches by merging the switches in each switch pair. The embodiment in FIG. 16C has two such switch pairs in a similar location, but were merged in the figure.

FIGS. 17A-17D show four possible variants of configurations for the architecture of FIG. 15. These differ in whether or not they use a magnetic filter 24 at all, and if so, which charge-pump terminal is connected to it.

Figure 17A:
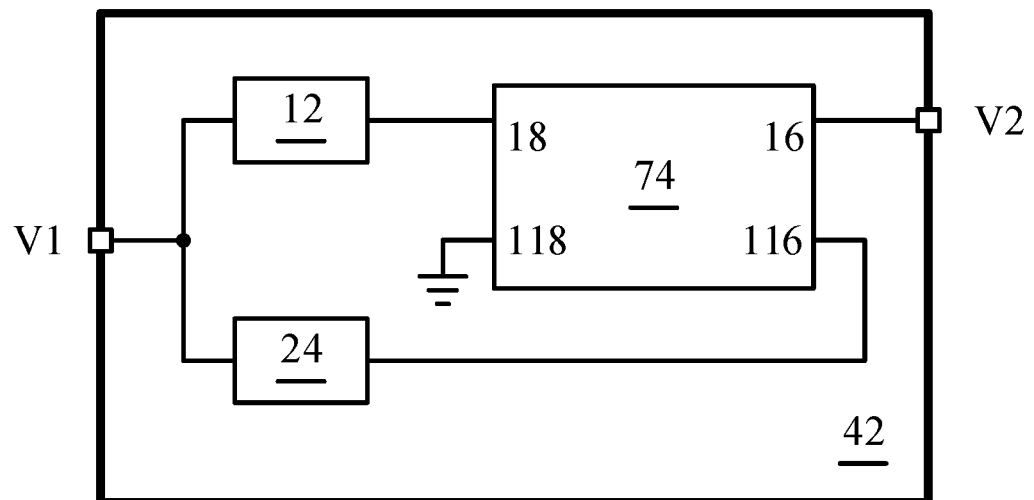
FIGS. 17A-17D show variants of the architecture shown in FIG. 15A.

In a first configuration 42, shown in FIG. 17A, the regulator 12 is connected to the second CP-terminal 18 of the 4-terminal charge pump 74, while the magnetic filter 24 is connected to the fourth CP-terminal 116 of the 4-terminal charge pump 74. A suitable regulator for this configuration is a boost converter.

Figure 17B:
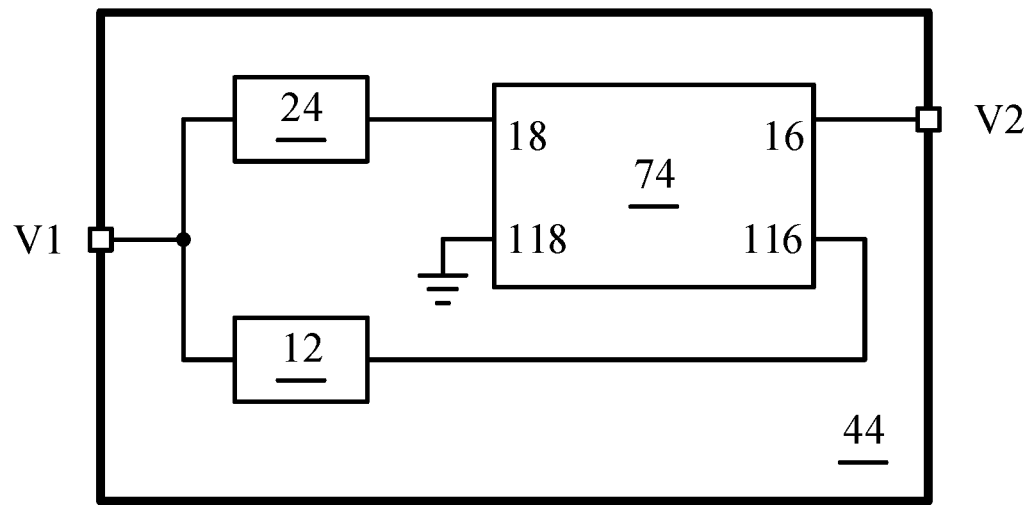

A second configuration 44, shown in FIG. 17B, is the converse of the first configuration 42. This second configuration 44 is particularly advantageous because most of the current flows through the second CP-terminal 18. Thus, the regulator 12 is placed at the lower current terminal, and therefore accrues all the advantages associated with such placement as already discussed.

Figure 17C:
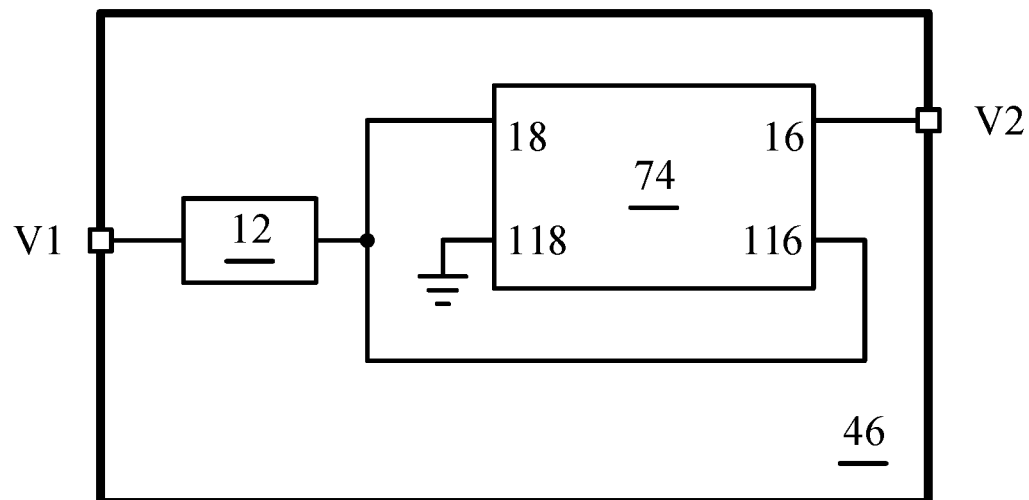

A third configuration 46, shown in FIG. 17C, dispenses with a magnetic filter 24 altogether and just has a regulator 12 connected to the second and fourth CP-terminals 18, 116 of the 4-terminal charge pump 74.

Figure 17D:
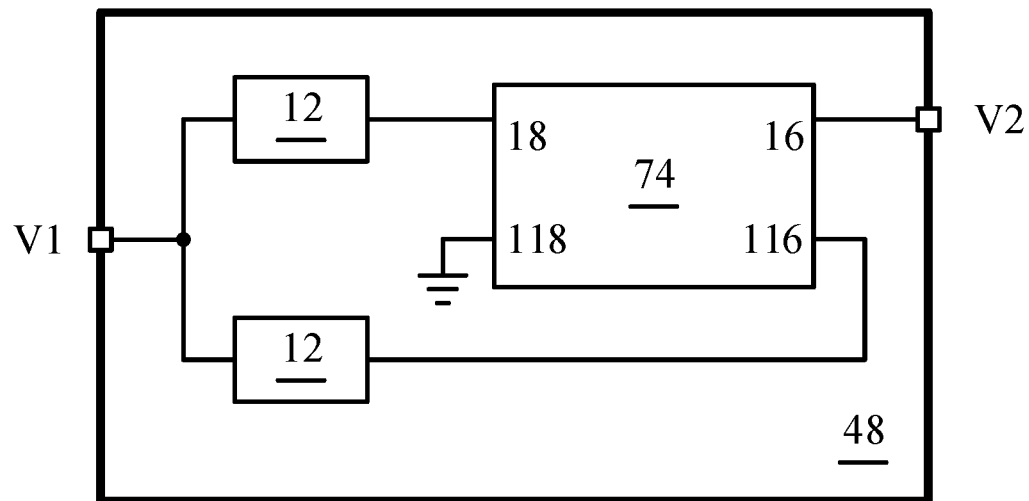

A fourth configuration 48, shown in FIG. 17D, also dispenses with the magnetic filter 24 but uses a separate regulator 12 at the second and fourth CP-terminals 18, 116. This fourth configuration offers considerable flexibility since the duty cycles of each regulator 12 can be controlled independently of each other.

In the third configuration 46, shown in FIG. 17C, there is only multiplicative control over a second voltage V2. In particular, the second voltage V2 is given by the product of the first voltage V1 and $((N+1)/(D+1))$, where N is the number of stages in the 4-terminal charge pump 74 and D is the duty cycle of the regulator 12, with D=1 corresponding to a permanently closed switch.

On the other hand, the first and second configurations 42, 44, shown in FIGS. 17A and 17B, offer a combination of additive and multiplicative control over the second voltage V2.

In particular, in the first configuration 42, shown in FIG. 17A, the second voltage V2 is given by the product of the first voltage V1 and $(1+N/(1-D))$.

In the second configuration 44, shown in FIG. 17B, the second voltage V2 is given by the product of the first voltage V1 and $(N+1/(1-D))$. This provides greater flexibility because the additive and multiplicative control is decoupled.

The fourth configuration 48, shown in FIG. 17D, provides greater flexibility in control because of the presence of another degree of freedom. In the fourth configuration 48, the second voltage V2 is given by the product of the first voltage V1 and $((1/(1-D2))+(N/(1-D1)))$, where D1 and D2 are duty cycles for the two regulators shown in the FIG. 17D.

The circuits described above are representative of a variety of topologies that provide parallel power paths. However, many others are shown in FIGS. 18A-18C and FIGS. 19A-19C.

Figure 18A:
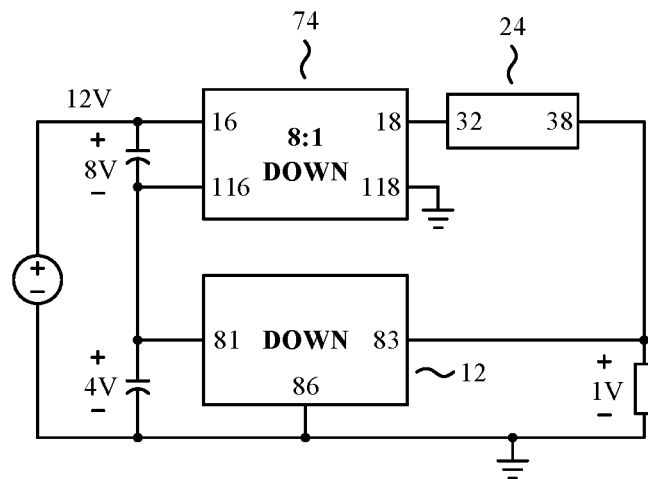
FIGS. 18A-18C show circuit topologies having bifurcated power paths with grounded charge pumps.
Figure 18B:
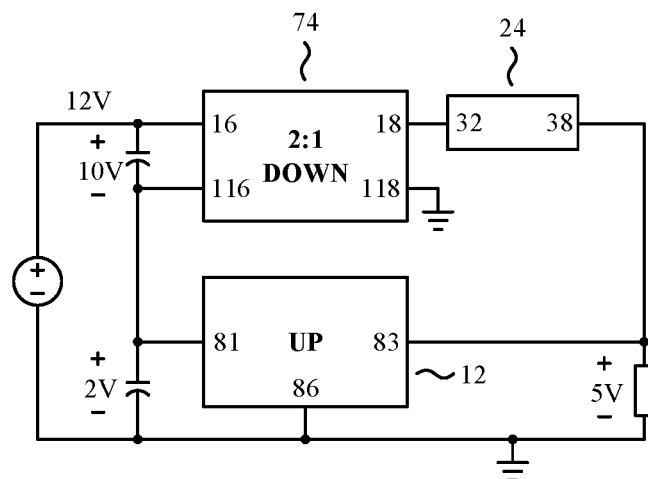
Figure 18C:
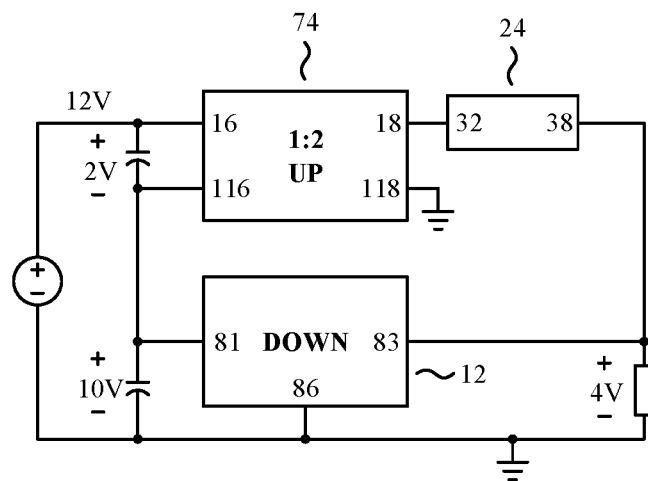

FIGS. 18A-18C show three topologies in which the 4-terminal charge pump 74 has a ground that is separate from that of the regulator 12. The terms "down" and "up" indicate the direction of voltage transformation. Thus, a circuit element identified by "down" will have its output be at a lower voltage than its input. In contrast, a circuit element identified by "up" will have its output be at a higher voltage than its input.

Figure 19A:
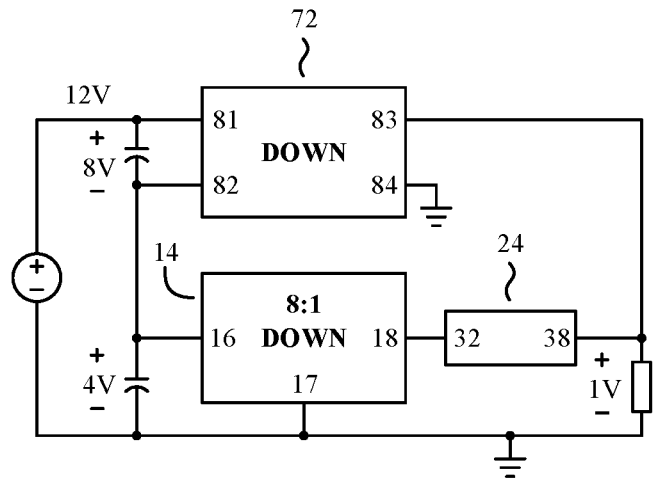
FIGS. 19A-19C show circuit topologies similar to those in FIGS. 18A-18C except with grounded regulators instead of charge pumps.
Figure 19B:
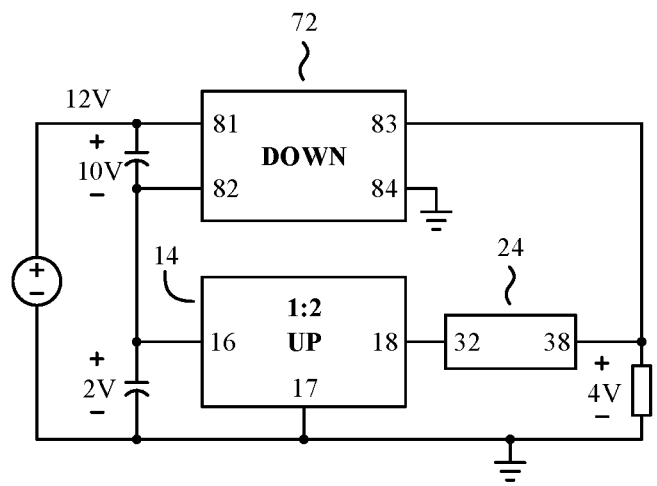
Figure 19C:
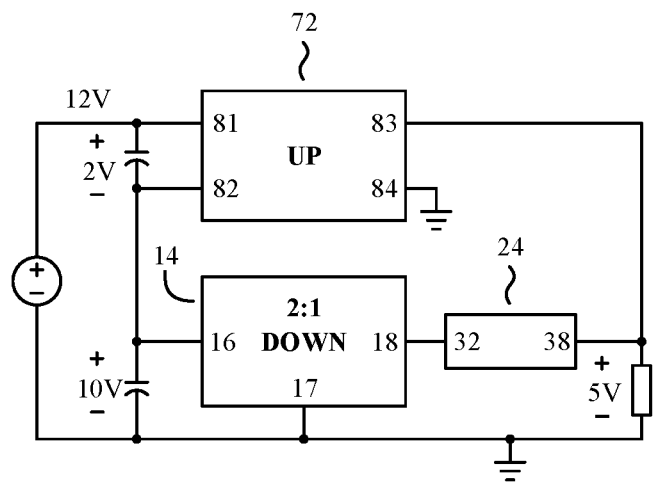

FIGS. 19A-19C show topologies in which the regulator 12, rather than the 3-terminal charge pump 14, has been isolated. These topologies require a regulator that incorporates a transformer, such as a flyback converter. As was the case with FIGS. 18A-18C, the regulator and charge pump can work in tandem or in opposite directions.

Figure 20:
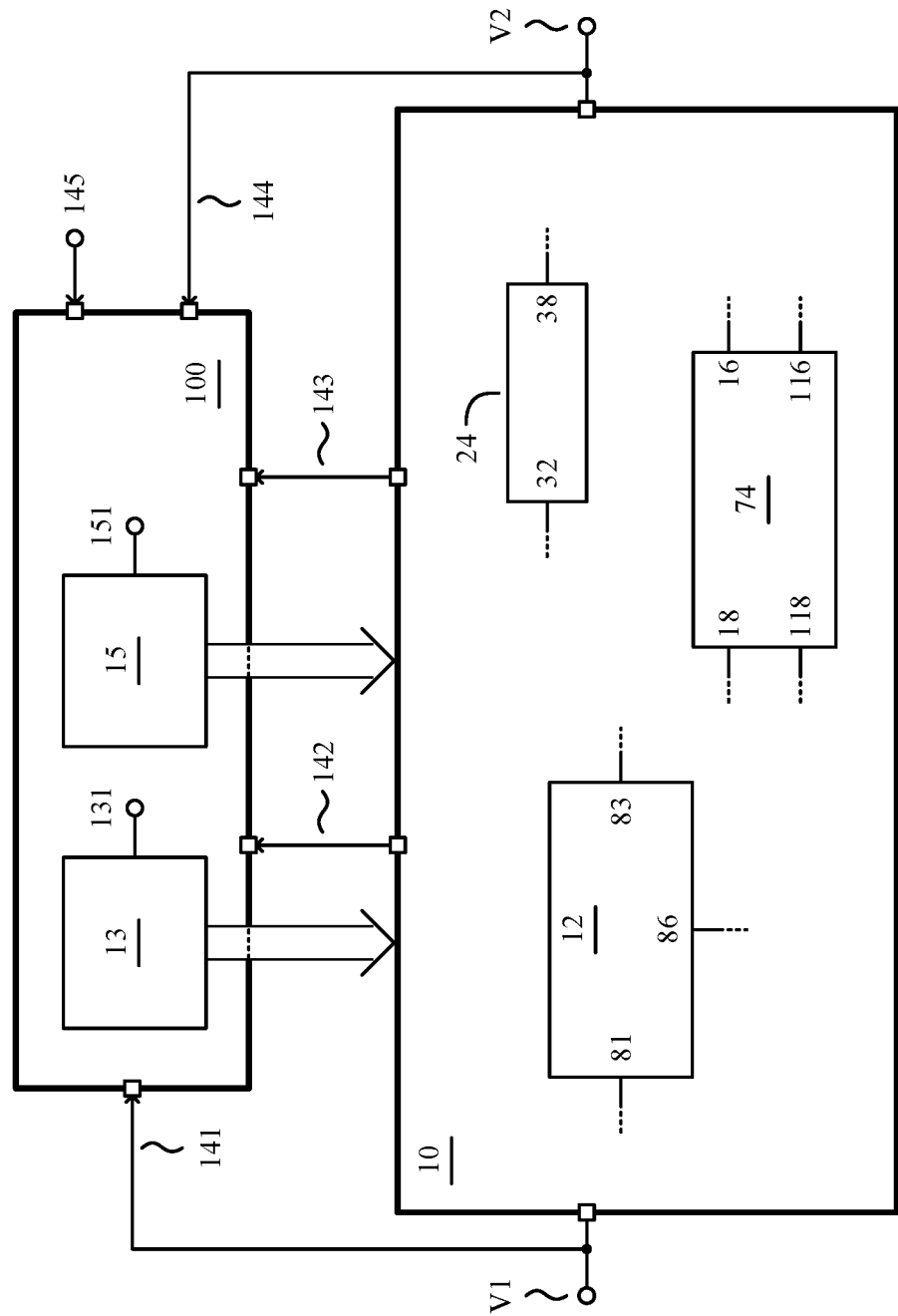
FIG. 20 shows a power converter that shows features common to the embodiments of FIGS. 1, 12, 13, and 15A.

FIG. 20 consolidates and summarizes the embodiments shown in FIGS. 1, 12, 13, and 15A, and in particular, draws attention to the fundamental modularity of the concepts described herein. The three general classes of components described herein, namely the regulator 12 (either isolated or non-isolated versions are applicable), the 4-terminal charge pump 74 (either isolated or non-isolated versions are applicable), and the magnetic filter 24, can be mixed and matched in various ways to achieve a variety of technical goals. What the embodiments have in common however is the ability to split the task of regulation from the task of promoting adiabatic charge transfer within the 3-terminal charge pump 14.

The circuit topologies described herein thus enable one to eliminate the large switch associated with having a regulator connected to a terminal of a charge pump that has a low voltage and a high current. Instead, an inductor replaces the regulator. The inductor is able to carry out one of the regulator's functions in the prior art, namely that of facilitating adiabatic inter-capacitor charge transport within the charge pump. However, it was precisely this function that pinned the regulator to the low-voltage second CP-terminal 18 of the charge pump. The fact that the regulator was pinned to the second CP-terminal 18 resulted in a great many technical problems, including the introduction of dead zones that may be inconveniently located, and the need to allocate a great deal of die space to the oversized switches that were necessary at that location. Having been liberated from its location at the second CP-terminal 18 of the charge pump, the regulator can now be placed in a variety of other locations. This, in turn, enables the circuit designer to adjust the locations of the dead zones of operation based on the requirements of the power converter. It also results in the ability to use a more modestly sized switch in the regulator, and to thereby save considerable die space.

In some embodiments described thus far, the regulator 12 connects to the first CP-terminal 16 of the 3-terminal charge pump 14. This means that less current will flow through the switch 20 in the regulator 12. As a result, it is possible to reduce the size of the switch 20. However, these embodiments have the disadvantage of still having a switch size greater than zero.

In other embodiments described thus far, the power path is bifurcated so that the majority of the current bypasses the regulator 12, and hence the switch 20, altogether. This approach also permits making the switch 20 smaller. However, this approach suffers from the disadvantage that some current still goes through the switch 20.

In another embodiment, the switch size is reduced to zero, effectively eliminating the problem altogether, but without giving up the regulating function of the regulator 12. The resulting circuit, which is referred to as a "regulated charge pump," minimizes loss due to the switch 20 by causing the 3-terminal charge pump 14 and regulator 12 to share a common switch set, none of which will carry the full brunt of all the current that passes through the power converter 10.

Figure 21A:
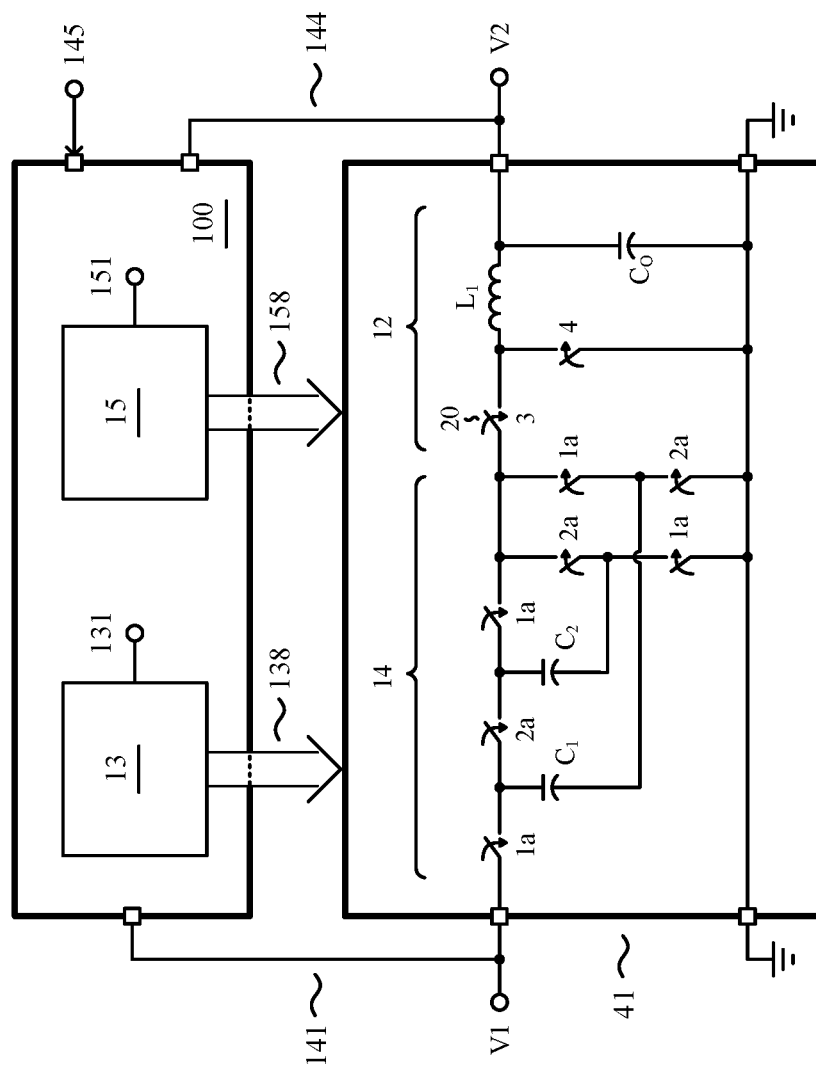
FIG. 21A shows a regulated charge pump.
Figure 21B:
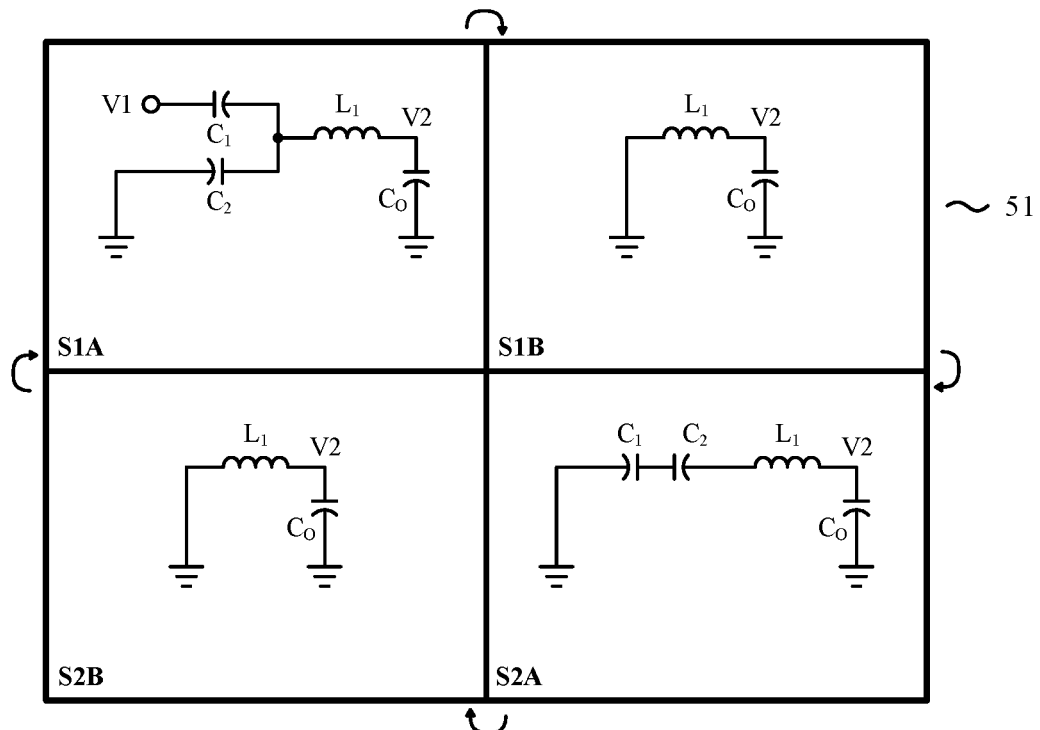
FIGS. 21B-21C show the switch configurations and network states for the regulated charge pump of FIG. 21A.
Figure 21C:
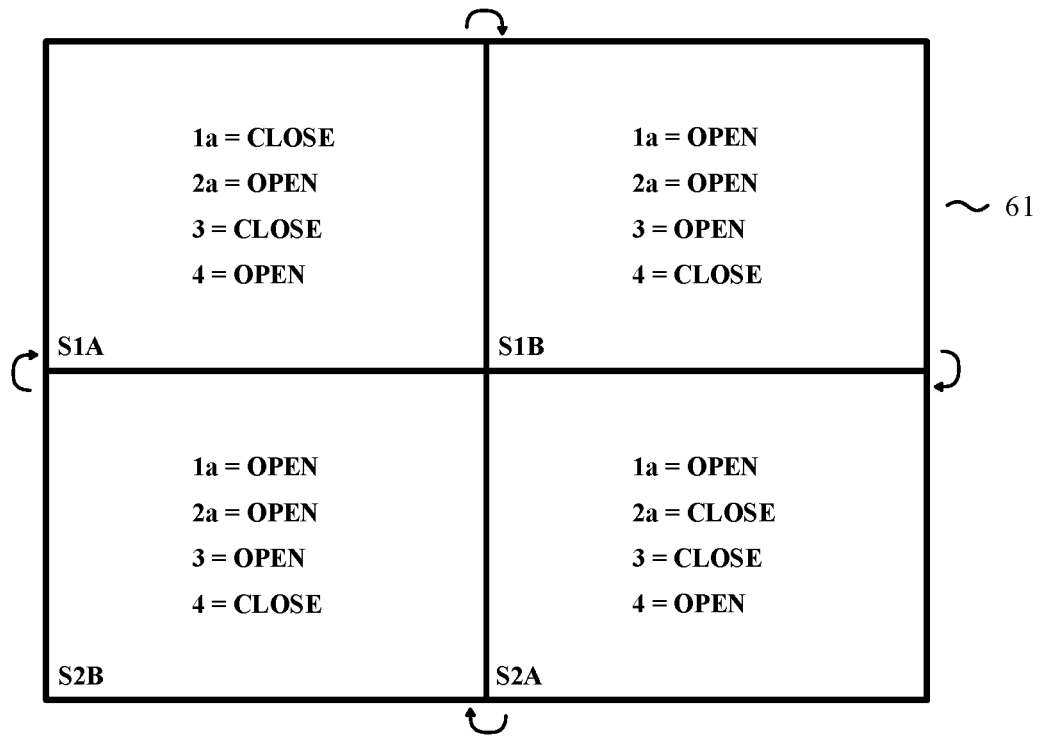

As a first example, FIG. 21A shows a buck converter 12 and a 3-terminal charge pump 14 that have been merged to create a first regulated charge pump 41. The first regulated charge pump 41 still has the switch 20 that was originally in the regulator 12. This switch 20 carries considerable current. Operation of the first regulated charge pump 41 includes cycling the circuit through a first set of network states 51 using a first set of switch configurations 61, as shown in FIGS. 21B-21C. A disadvantage of the first regulated charge pump 41 is therefore that the switch 20 is still present.

Figure 22A:
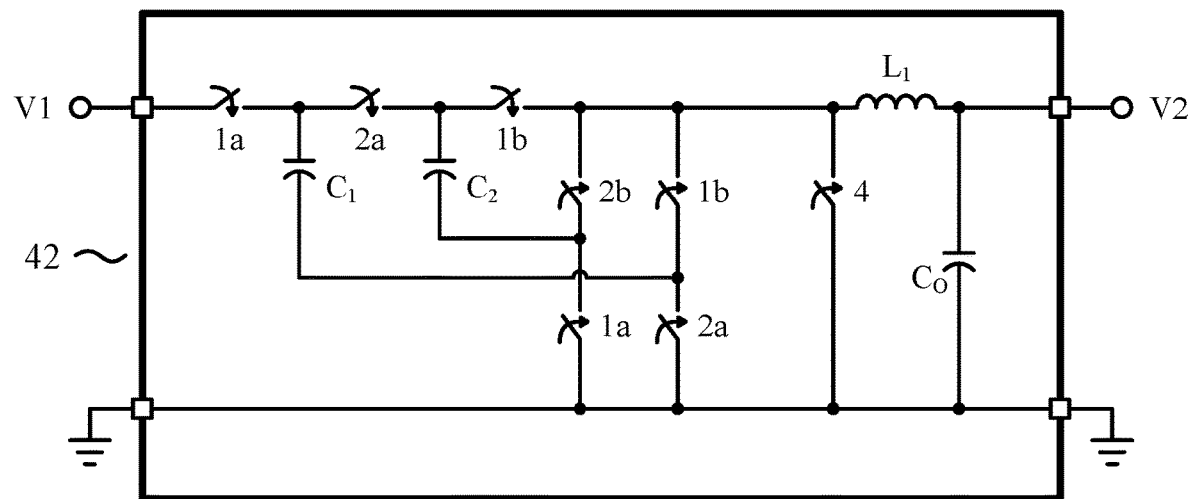
FIG. 22A shows a regulated charge pump of FIG. 21A with a switch having been eliminated.
Figure 22B:
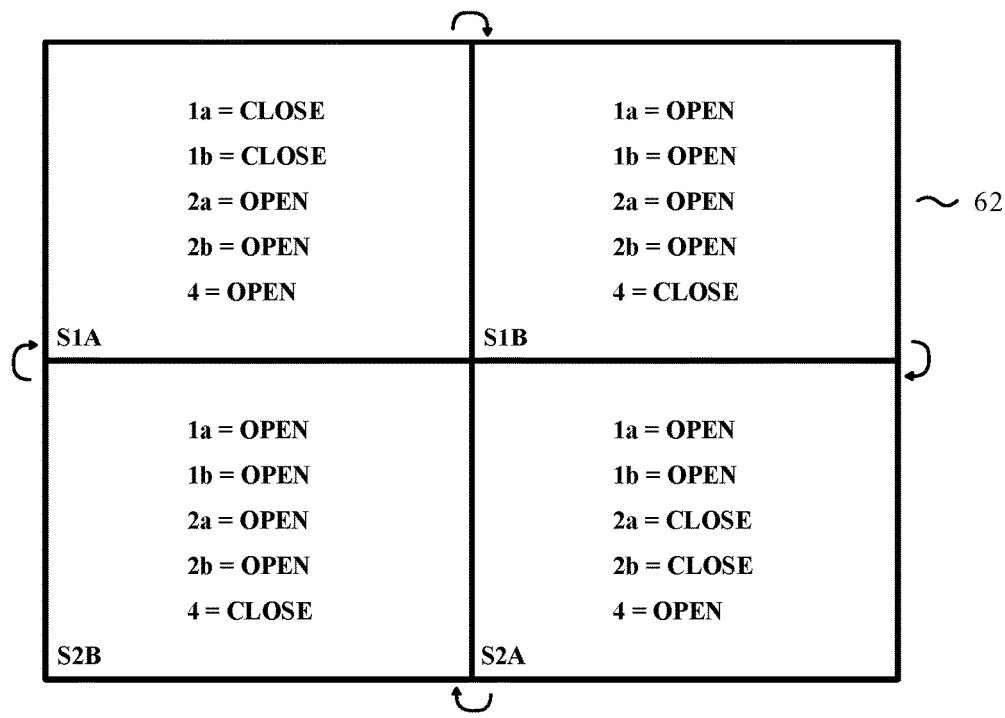
FIG. 22B shows the switch configurations for the regulated charge pump of FIG. 22A.

A second regulated charge pump 42, shown in FIG. 22A, eliminates the switch 20. In effect, the functionality of the switch 20 has been incorporated into the 3-terminal charge pump 14. Operation of this second regulated charge pump 42 includes attaining the same first set of network states 51 but using a different, second set of switch configurations 62, shown in FIG. 22B.

A disadvantage of the second regulated charge pump 42 is that all switches must run at the same frequency. This can be inconvenient because the capacitors and the inductor tend to have different energy densities. However, for cases in which the current is quite high, the advantage associated with eliminating the switch 20 can outweigh this disadvantage.

Figure 23A:
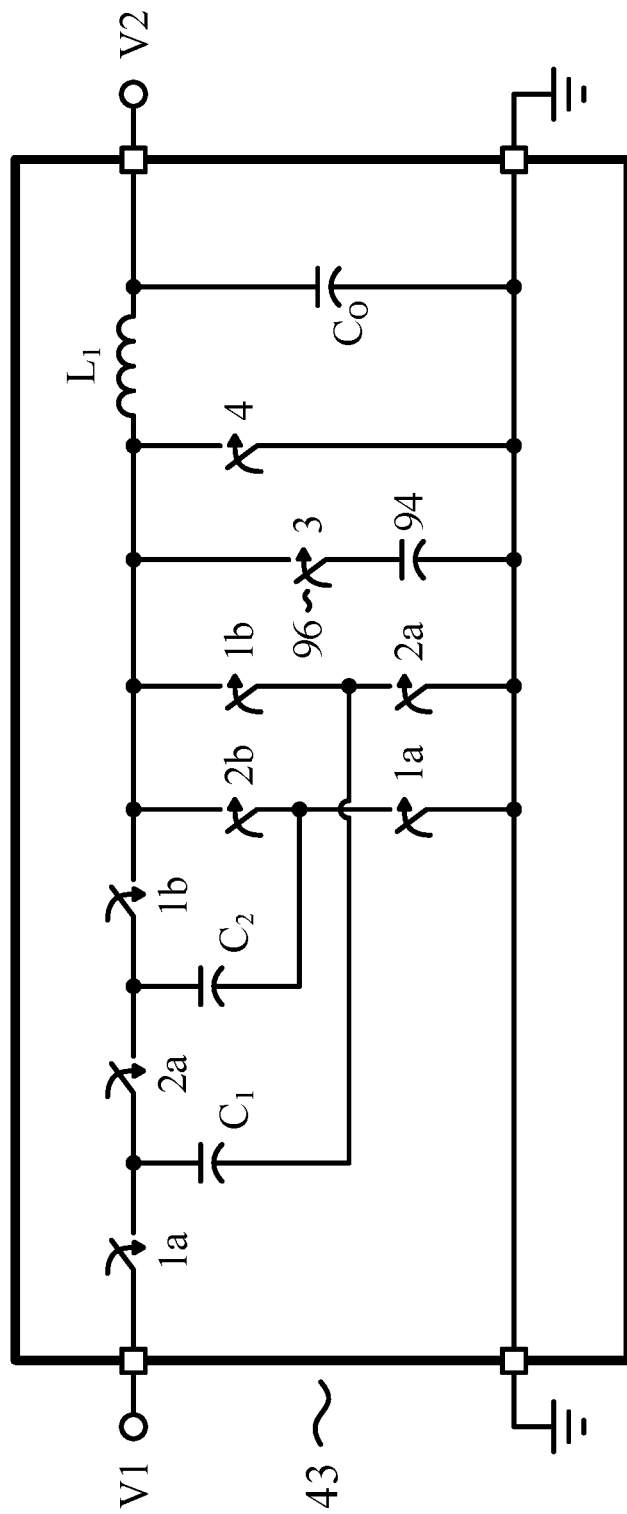
FIG. 23A shows the regulated charge pump of FIG. 22A with a stabilizing capacitor.
Figure 23B:
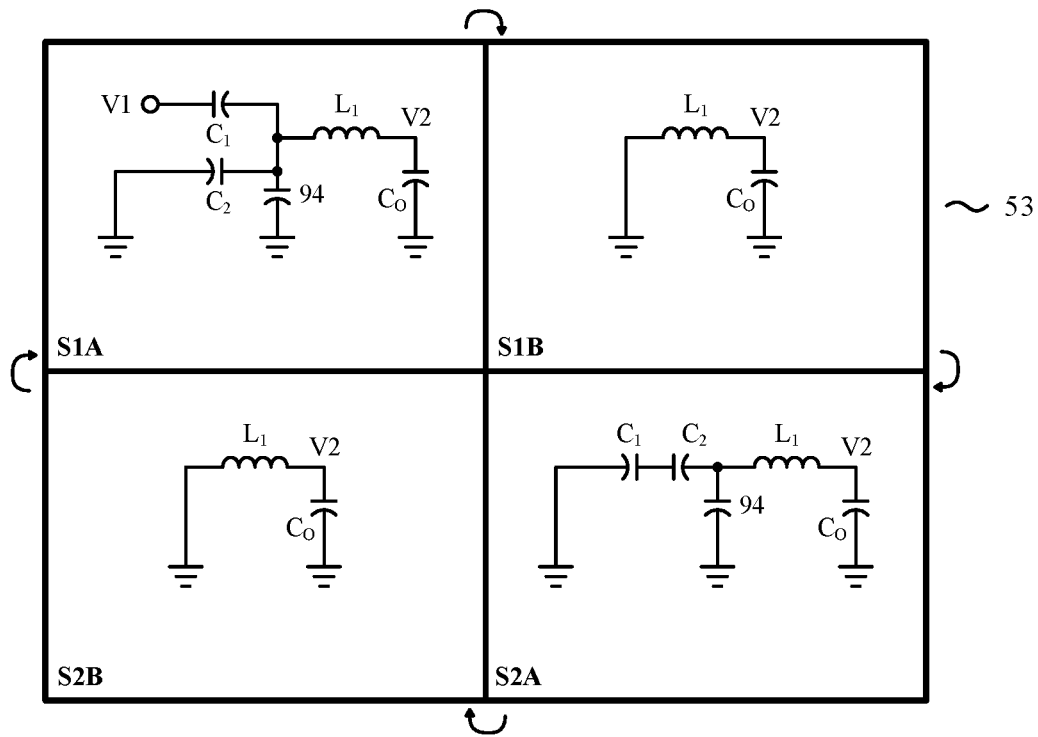
FIGS. 23B-23C show the switch configurations and network states for the regulated charge pump of FIG. 23A.
Figure 23C:
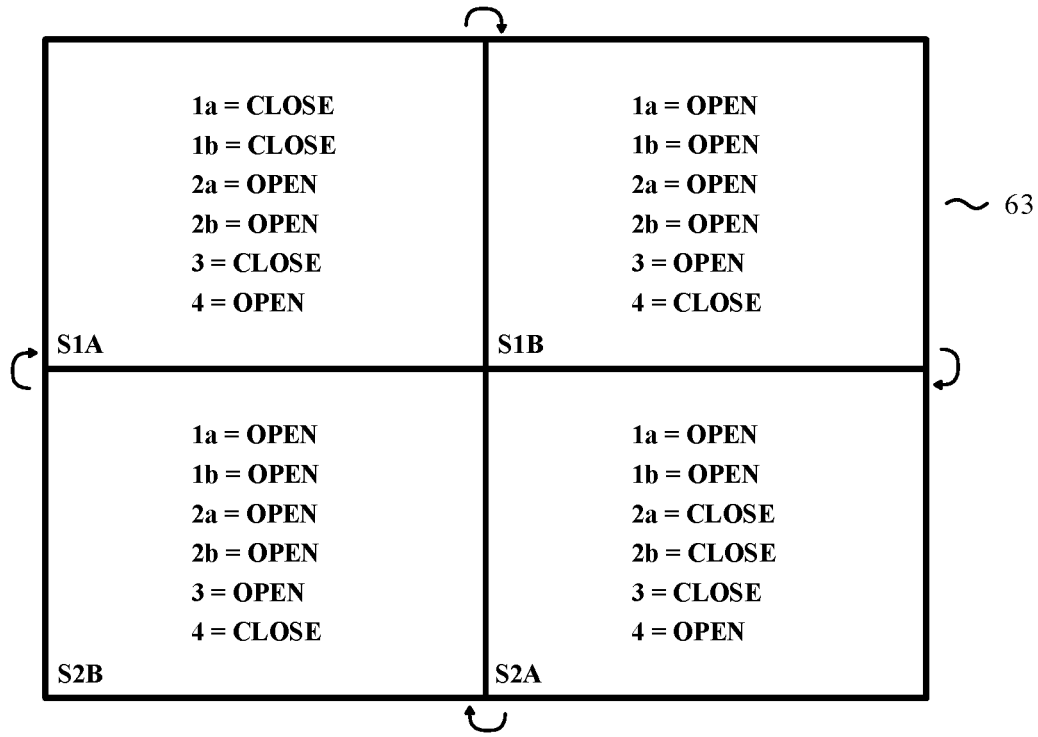

Another disadvantage of the second regulated charge pump 42 is that the overall circuit can potentially become an unstable oscillator. To reduce the likelihood of this occurring, a third regulated charge pump 43, shown in FIG. 23A, introduces a stabilizing capacitor 94 and a stabilizing switch 96. The loss arising from the stabilizing switch 96 is minimal because only a small amount of current has to flow into the stabilizing capacitor 94. Operation of this third regulated charge pump 43 involves cycling through a second set of network states 53 using a third set of switch configurations 63, as shown in FIGS. 23B-23C.

In the regulated charge pumps thus far, although a first switch 20 of the regulator 12 has been eliminated, a second switch remains. In a fourth regulated charge pump 44, shown in FIG. 24A, even this switch is eliminated. The resulting circuit is essentially a 3-terminal charge pump 14 with an LC circuit 98 at its output end. Operation of this fourth regulated charge pump 44 involves cycling through the first set of network states 51 using a fourth set of switch configurations 64, as shown in FIG. 21B and FIG. 24B, respectively.

The fourth regulated charge pump 44 can also be operated by cycling through three network states instead of four. This reduces switching loss associated with each switch transition because there are fewer switch transitions per cycle. The two alternatives are represented by third and fourth sets of network states 58, 59, each of which consists of three rather than four states, and corresponding fifth and sixth sets of three switch configurations 68, 69, as shown in FIGS. 25A-26B.

Figure 24A:
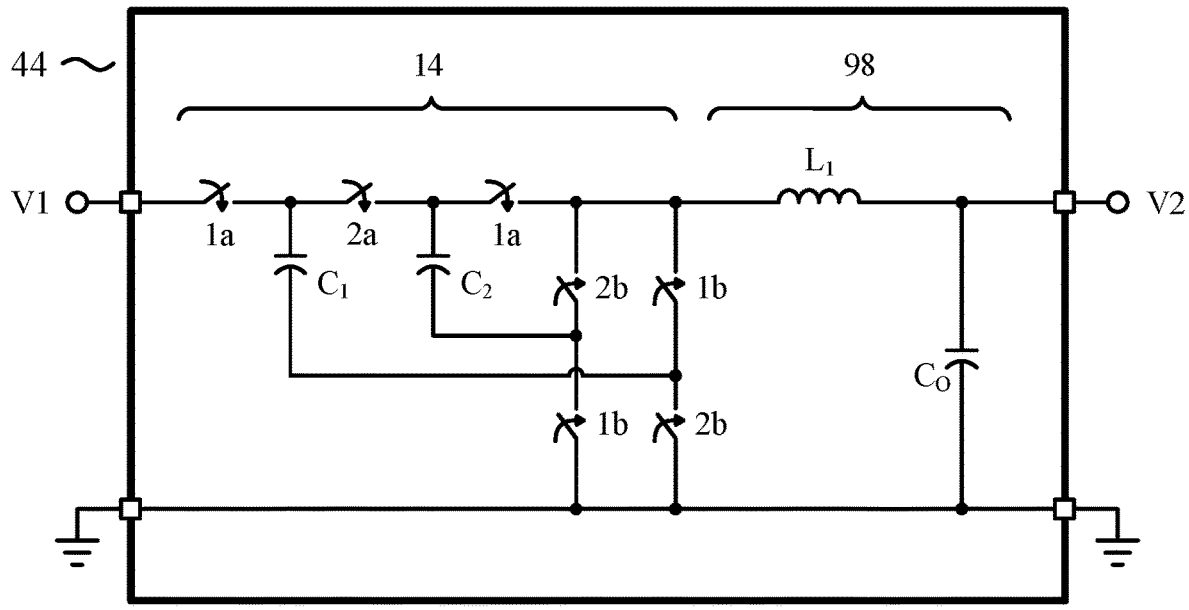
FIG. 24A shows a regulated charge pump in which both switches of the regulator have been removed.
Figure 27A:
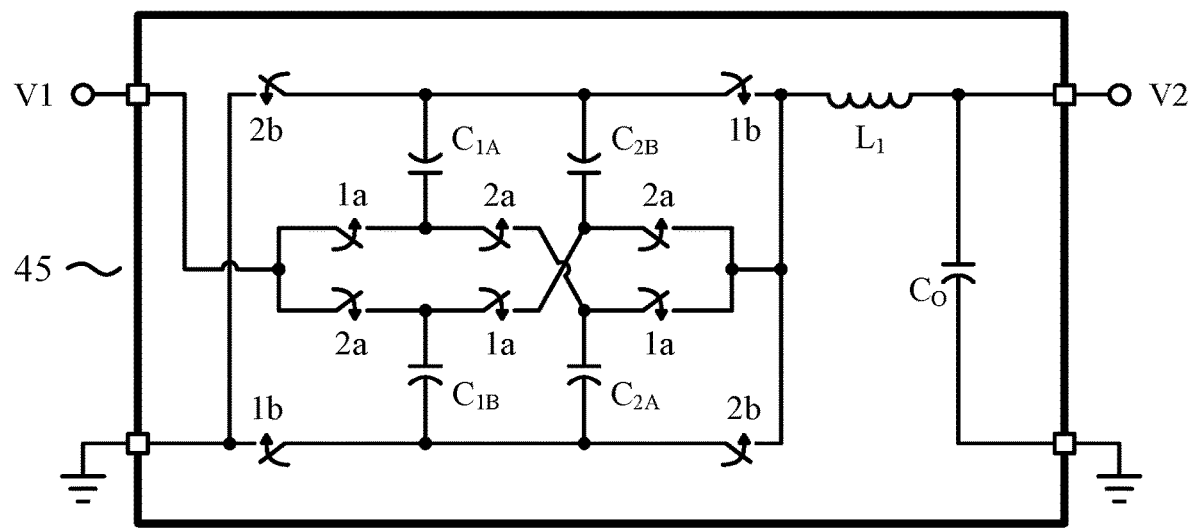
FIG. 27A is a two-phase implementation of the regulated charge pump of FIG. 24A.

The technique used to eliminate both switches from the regulator 12 that was used in connection with the fourth regulated charge pump 44, shown in FIG. 24A, can be used to implement a two-phase version, which is the fifth regulated charge pump 45 shown in FIG. 27A.

Figure 24B:
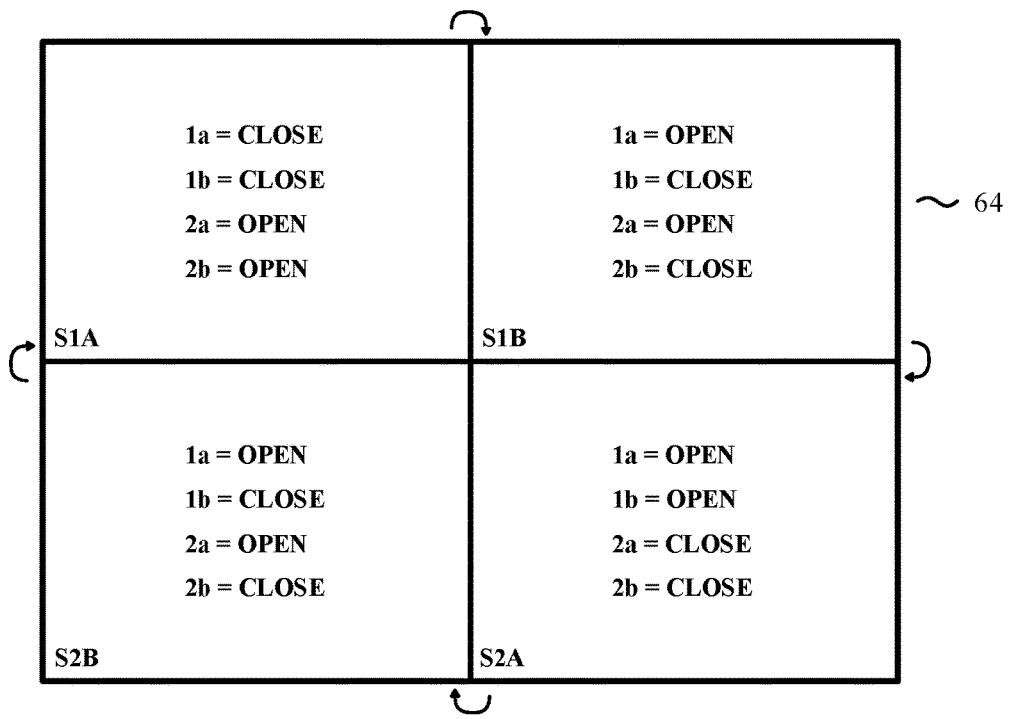
FIG. 24B shows the switch configurations for the regulated charge pump of FIG. 24A.
Figure 25A:
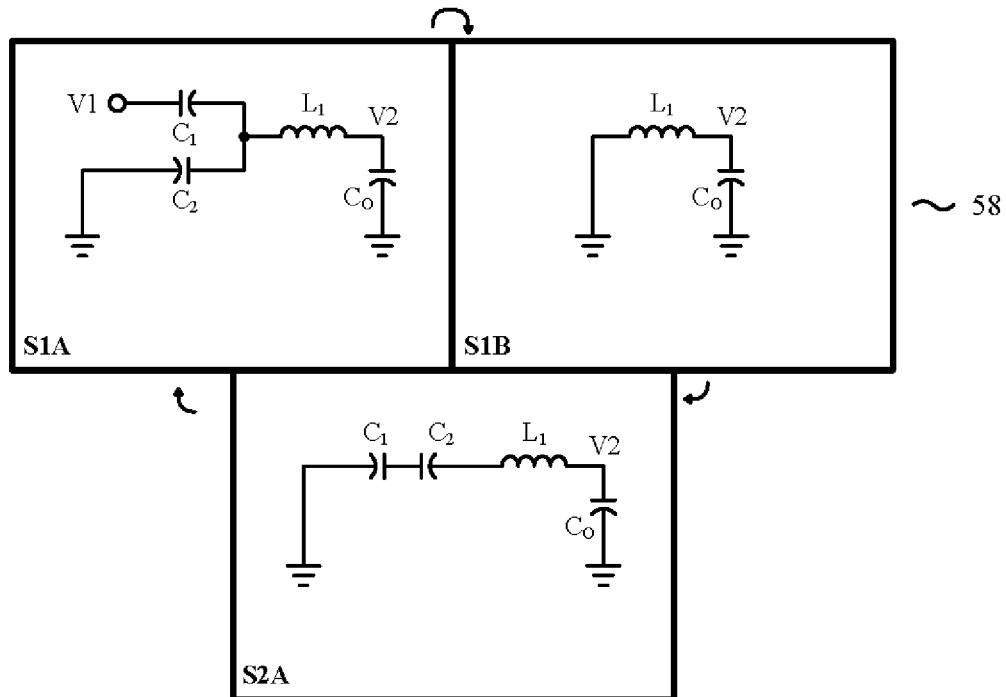
FIGS. 25A-26B show, for the regulated charge pump of FIG. 24A, additional switch configurations and network states in which there are only three states and configurations needed to operate the charge pump.
Figure 25B:
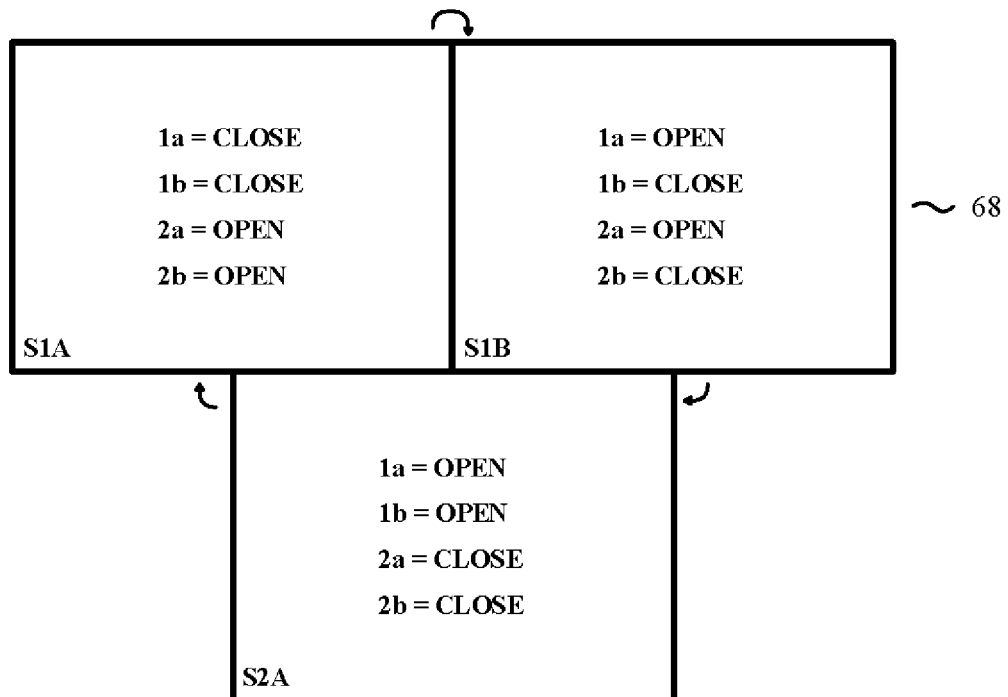
Figure 26A:
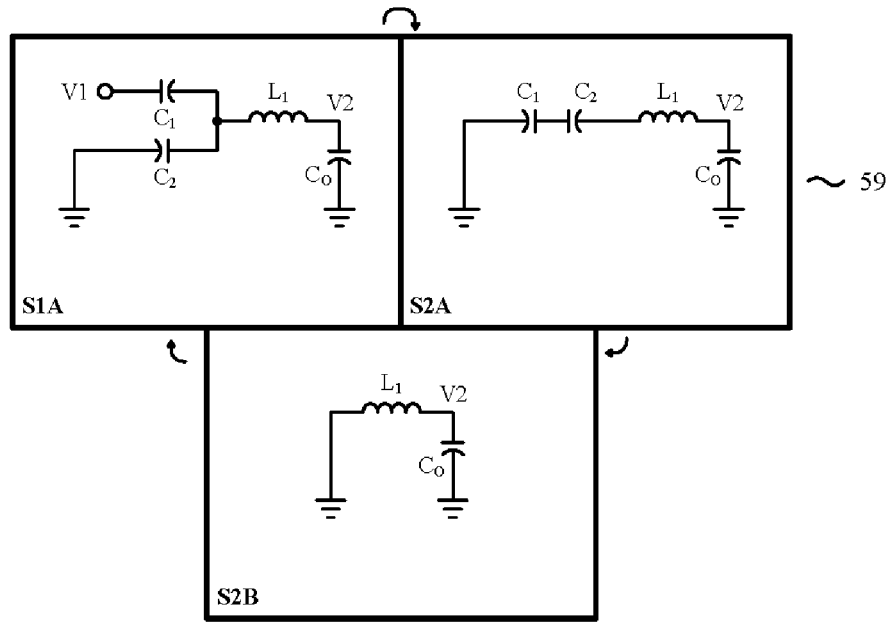
Figure 26B:
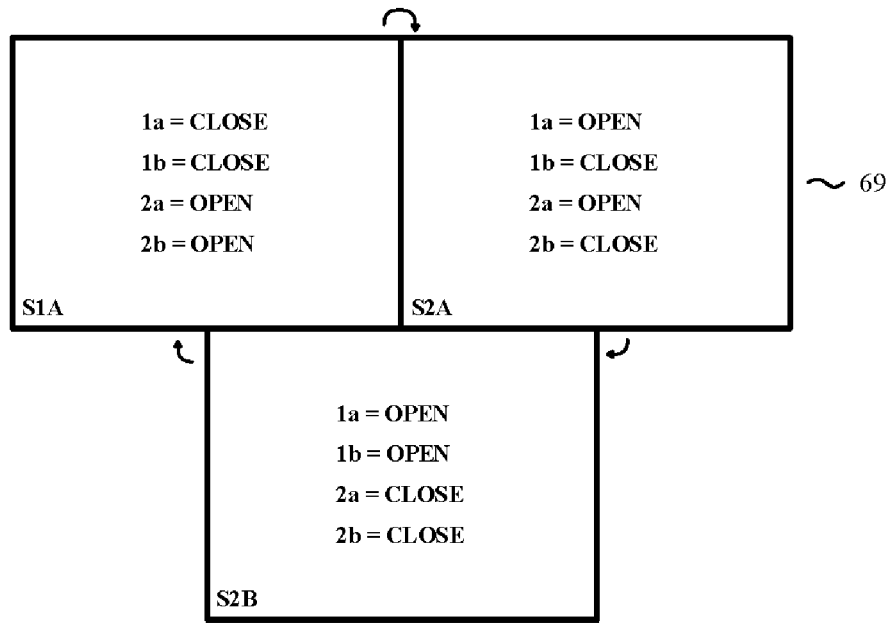
Figure 27B:
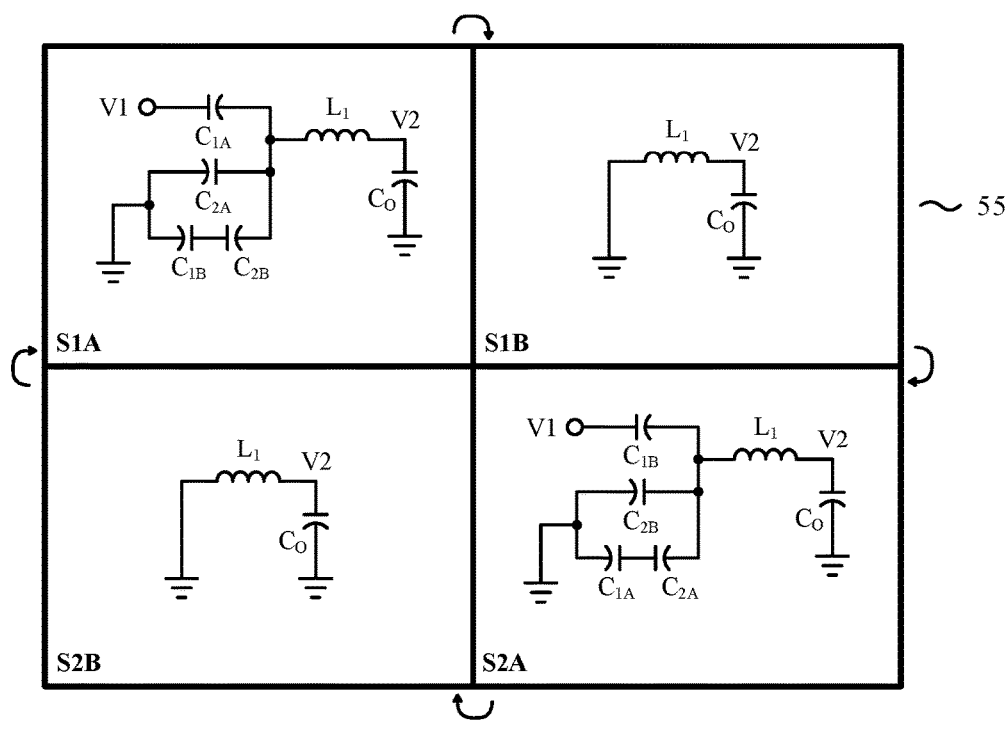
FIG. 27B shows the network states for the regulated charge pump of FIG. 27A.

Operation of this fifth regulated charge pump 45 involves cycling through a fifth set of network states 55 using the fourth set of switch configurations 64, as shown in FIG. 27B and FIG. 24B, respectively.

In some implementations, a computer accessible storage medium includes a database representative of one or more components of the converter. For example, the database may include data representative of a switching network that has been optimized to promote low-loss operation of a charge pump.

Generally speaking, a computer accessible storage medium may include any non-transitory storage media accessible by a computer during use to provide instructions and/or data to the computer. For example, a computer accessible storage medium may include storage media such as magnetic or optical disks and semiconductor memories.

Generally, a database representative of the system may be a database or other data structure that can be read by a program and used, directly or indirectly, to fabricate the hardware comprising the system. For example, the database may be a behavioral-level description or register-transfer level (RTL) description of the hardware functionality in a high level design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, Alternatively, the database may itself be the netlist (with or without the synthesis library) or the data set.

Having described the invention, and a preferred embodiment thereof, what is claimed as new, and secured by Letters Patent is:

1. An apparatus comprising: a power converter that to transform a first voltage at a first power-converter terminal into a second voltage at a second power-converter terminal, said power converter comprising a switching network to interconnect capacitors in a capacitor network and a magnetic filter, said magnetic filter comprising a first magnetic-filter terminal and a second magnetic-filter terminal, wherein, with said capacitors connected to a switch from said switching network, said magnetic filter to impose a constraint upon inter-capacitor charge transfer between said capacitors, wherein said second magnetic-filter terminal is to be maintained at said second voltage, wherein said switches to operate at a common frequency and at a common duty cycle, wherein said switching network to transition between states, said states comprising a first state, a second state, and a third state, wherein, in both said first state and said third state, said first magnetic-filter terminal to couple to said capacitor network, wherein in said second state, said first magnetic-filter terminal is to be grounded, and wherein said second state to occur between said first and said third state.

2. The apparatus of claim 1, wherein said capacitors and said switching network to cooperate to define a single-phase charge pump.

3. The apparatus of claim 1, wherein said capacitors and said switching network to cooperate to define a multi-phase charge pump.

4. The apparatus of claim 1, wherein, in said first state, said first magnetic-filter terminal to couple to a node, a cathode of a first capacitor to connect to said node, and an anode of a second capacitor to connect to said node and wherein, in said second state, cathodes of said first and said second capacitors to connect to each other and said first magnetic-filter terminal to connect to an anode of one of said first and said second capacitors.

5. The apparatus of claim 1, wherein said states to comprise a fourth state, wherein said fourth state to be selected from said first state, said second state, or said third state, wherein said switching network to execute a cycle, wherein said cycle to begin with a transition out of said fourth state and to end with a transition into said fourth state, and wherein said cycle to comprise three transitions between said states.

6. The apparatus of claim 1, wherein said states to comprise a fourth state, wherein said fourth state is to be selected from said first state, said second state, or said third state, wherein said switching network to execute a cycle, wherein said cycle to begin with a transition out of said fourth state and to end with a transition into said fourth state, and wherein said cycle to comprise four transitions between said states.

7. The apparatus of claim 1, wherein, during said cycle, said second state to occur twice.

8. The apparatus of claim 1, wherein said switching network to comprise a stabilizing switch to connect a stabilizing capacitor to said first magnetic-filter terminal and to disconnect said stabilizing capacitor from said first magnetic-filter terminal.

9. The apparatus of claim 8, wherein, during a cycle, each switch in said switching network to sustain a current therethrough and wherein said stabilizing switch to sustain less current than any other switch in said switching network.

10. The apparatus of claim 1, wherein said second magnetic-filter terminal to connect to a capacitor.

11. The apparatus of claim 1, wherein said switching network comprises a first switch, wherein said first switch to connect said first magnetic-filter terminal to said capacitor network and to disconnect said first magnetic-filter terminal from said capacitor network.

12. The apparatus of claim 11, wherein said switching network comprises a second switch, wherein said second switch to connect said first magnetic-filter terminal to ground with said first switch to disconnect said first magnetic-filter terminal from said capacitor network and wherein said second switch is to be open otherwise.

13. The apparatus of claim 1, wherein said switching network comprises a first switch, wherein said first switch to transition between said first and said second states, wherein in said first state said first magnetic-filter terminal to be connected to ground and in said second state said first magnetic-filter terminal to be disconnected from ground.

14. The apparatus of claim 1, wherein said magnetic filter comprises an LC circuit to be connected to said capacitor network.

15. The apparatus of claim 1, wherein said capacitor network and said switching network to cooperate to define a two-phase charge pump.

\* \* \* \* \*